United States Patent
Hussain et al.

(10) Patent No.: US 11,421,145 B2
(45) Date of Patent: Aug. 23, 2022

(54) OIL RECOVERY METHODS USING A FORMULATION CONTAINING AN UNSATURATED ZWITTERIONIC SURFACTANT AND A POLYMER

(71) Applicant: King Fahd University of Petroleum and Minerals, Dhahran (SA)

(72) Inventors: Syed M. Shakil Hussain, Dhahran (SA); Muhammad Shahzad Kamal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/444,435

(22) Filed: Jun. 18, 2019

(65) Prior Publication Data
US 2020/0263077 A1  Aug. 20, 2020

Related U.S. Application Data

(60) Provisional application No. 62/806,273, filed on Feb. 15, 2019.

(51) Int. Cl.
*C09K 8/584* (2006.01)
*C09K 8/588* (2006.01)

(52) U.S. Cl.
CPC ............ *C09K 8/584* (2013.01); *C09K 8/588* (2013.01)

(58) Field of Classification Search
None
See application file for complete search history.

(56) References Cited

U.S. PATENT DOCUMENTS

| 7,160,970 B2 | 1/2007 | Creamer et al. |
| 2009/0197791 A1 | 8/2009 | Balastre et al. |
| 2018/0037792 A1 | 2/2018 | Champagne et al. |
| 2019/0233716 A1* | 8/2019 | Alexis ............... C09K 8/602 |

FOREIGN PATENT DOCUMENTS

| CN | 10211 4397 | * 7/2011 |
| CN | 102503864 A | 6/2012 |

(Continued)

OTHER PUBLICATIONS

Kamal, et al. ; Evaluation of Rheological and Thermal Properties of a New Fluorocarbon Surfactant-Polymer System for EOR Applications in High-Temperature and High-Salinity Oil Reservoirs ; Journal of Surfactants and Detergents, vol. 17, Issue 5 ; pp. 985-993 ; Sep. 2003 ; 10 Pages.

(Continued)

*Primary Examiner* — Jeffrey D Washville
(74) *Attorney, Agent, or Firm* — Oblon, McClelland, Maier & Neustadt, L.L.P.

(57) ABSTRACT

A method of recovering oil from a reservoir using an aqueous composition that contains an unsaturated zwitterionic surfactant and a copolymer. The unsaturated zwitterionic surfactant is an amidoamine-based surfactant having a sulfonate head group and an alkenyl tail. The copolymer contains reacted units of acrylamide and 2-acrylamido-2-methylpropane sulfonic acid (AM-AMPS). This method is particularly effective for enhanced oil recovery in carbonate reservoirs of high temperature and/or high salinity.

18 Claims, 6 Drawing Sheets

3-(N-stearamidopropyl-N, N-dimethyl ammonium) propanesulfonate 3-(N-oleamidopropyl-N, N-dimethyl ammonium) propanesulfonate

(56) References Cited

FOREIGN PATENT DOCUMENTS

ID  201701948 A  3/2017
WO  2018/081063 A1  5/2018

OTHER PUBLICATIONS

Kamal ; Evaluation of Different Surfactant-Polymer Systems for EOR Applications in High-Temperature Highsalinity Saudi Carbonate Reservoirs ; Department of Chemical Engineering ; Dec. 2014 ; Doctor of Philosophy in Chemical Engineering Dissertation ; 249 Pages.

Abdullah, et al. ; Synthesis of novel water soluble poly (ionic liquids) based on quaternary ammonium acrylamidomethyl propane sulfonate for enhanced oil recovery ; Journal of Molecular Liquids, vol. 233 ; pp. 508-516 ; May 2017 ; Abstract Only ; 2 Pages.

Zhao, et al. ; The structure effect on the surface and interfacial properties of zwitterionic sulfobetaine surfactants for enhanced oil recovery ; RSC Advanced Issue 18 ; 2015; Abstract Only ; 4 Pages.

\* cited by examiner 3-(N-stearamidopropyl-N, N-dimethyl ammonium) propanesulfonate 3-(N-oleamidopropyl-N, N-dimethyl ammonium) propanesulfonate AM-AMPS copolymer

OIL RECOVERY METHODS USING A FORMULATION CONTAINING AN UNSATURATED ZWITTERIONIC SURFACTANT AND A POLYMER

CROSS REFERENCE TO RELATED APPLICATIONS

This application claims the benefit of priority of U.S. Provisional Application No. 62/806,273 filed Feb. 15, 2019, the entire contents of which are herein incorporated by reference.

STATEMENT OF FUNDING ACKNOWLEDGEMENT

This project was funded by the Center for Integrative Petroleum Research (CIPR), King Fahd University of Petroleum and Minerals (KFUPM), under project number SF 17003.

STATEMENT REGARDING PRIOR DISCLOSURE BY THE INVENTORS

Aspects of this technology are described in an article "A Zwitterionic Surfactant Bearing Unsaturated Tail for Enhanced Oil Recovery in High-Temperature High-Salinity Reservoirs" published in *J. Surfact. Deterg.*, 2018, 21, 165-174, on Feb. 21, 2018, which is incorporated herein by reference in its entirety.

BACKGROUND OF THE INVENTION

Technical Field

The present disclosure relates to a method for oil recovery. More specifically, the present disclosure relates to a method for enhanced oil recovery using a formulation involving a copolymer and a surfactant having a sulfonate head group, and an alkenyl tail.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In general, only about 30% of the original oil present in a reservoir is produced by the primary and secondary oil recoveries [Li, P., Yang, C., Cui, Z., Song, B., Jiang, J., & Wang, Z. (2016) A new type of sulfobetaine surfactant with double alkyl polyoxyethylene ether chains for enhanced oil recovery. *Journal of Surfactants and Detergents*, 19:967-977]. Tertiary oil recovery or enhanced oil recovery (EOR) techniques are designed to extract the remaining oil in place after the primary and secondary recoveries. EOR methods offer prospects for providing an additional oil recovery of 20-30%, and an ultimate recovery of 50-60% of the reservoir's original oil in place. Major categories of EOR include thermal recovery, gas injection, and chemical EOR. Although chemical EOR is one of the most effective methods to recover additional oil, it is seldom used because profit margins are small due to low oil prices and high associated chemical cost. However, the growing demand for oil has encouraged researchers to develop less expensive chemical EOR methods. Chemical EOR has been implemented in China, the U.S.A, Malaysia, and Oman.

Different EOR chemicals, such as alkalis, chelating agents, surfactants, and polymers, have been tested for improving oil/water mobility ratio, reduce oil/water interfacial tension (IFT), and/or change the wettability of the rock [Al-Amodi, A. O., Al-Mubaiyedh, U. A., Sultan, A. S., Kamal, M. S., & Hussein, I. A. (2016) Novel fluorinated surfactants for enhanced oil recovery in carbonate reservoirs. *Canadian Journal of Chemical Engineering*, 94:454-460; Hussain, S. S., Kamal, M. S., Ali, B. E., & Sultan, A. S. (2017) Synthesis and evaluation of novel Amido-amine cationic Gemini surfactants containing flexible and rigid spacers. *Journal of Surfactants and Detergents*, 20:777-788; and Hussain, S. S., Kamal, M. S., & Sultan, A. S. (2017) Amido-amine-based cationic Gemini surfactants: Thermal and interfacial properties and interactions with cationic polyacrylamide. *Journal of Surfactants and Detergents*, 20:47-55]. Polymers have been developed to increase viscosity of the displacing fluid and alter the oil/water mobility ratio [Kamal, M. S., Sultan, A. S., Al-Mubaiyedh, U. A., & Hussein, I. A. (2015) Review on polymer flooding: Rheology, adsorption, stability, and field applications of various polymer systems. *Polymer Reviews*, 55:491-530]. Alkalis are injected to lower the adsorption of surfactant by adjusting the pH of the reservoir. Surfactants may reduce the oil/water IFT and improve the recovery of residual oil. In addition to IFT reduction, surfactants may improve the oil recovery via other mechanisms including alteration of wettability of the rock, micro-emulsification of the trapped oil, and alteration of interfacial and rheological properties [Ahmadi, M. A., Arabsahebi, Y., Shadizadeh, S. R., & Behbahani, S. S. (2014) Preliminary evaluation of mulberry leaf-derived surfactant on interfacial tension in an oil-aqueous system: EOR application. *Fuel*, 117:749-755; Ahmadi, M. A., Galedarzadeh, M., & Shadizadeh, S. R. (2015) Wettability alteration in carbonate rocks by implementing new derived natural surfactant: Enhanced oil recovery applications. *Transport in Porous Media*, 106:645-667; Ahmadi, M. A., & Shadizadeh, S. (2015) Experimental and theoretical study of a new plant derived surfactant adsorption on quartz surface: Kinetic and isotherm methods. *Journal of Dispersion Science and Technology*, 36:441-452; Ahmadi, M. A., & Shadizadeh, S. R. (2013a) Experimental investigation of adsorption of a new nonionic surfactant on carbonate minerals. *Fuel*, 104:462-467; Ahmadi, M. A., & Shadizadeh, S. R. (2013b) Implementation of a high-performance surfactant for enhanced oil recovery from carbonate reservoirs. *Journal of Petroleum Science and Engineering*, 110:66-73; Ahmadi, M. A., & Shadizadeh, S. R. (2013c) Induced effect of adding nano silica on adsorption of a natural surfactant onto sandstone rock: Experimental and theoretical study. *Journal of Petroleum Science and Engineering*, 112:239-247; Fu, L., Zhang, G., Ge, J., Liao, K., Pei, H., Jiang, P., & Li, X. (2016) Study on organic alkali-surfactant-polymer flooding for enhanced ordinary heavy oil recovery. *Colloids and Surfaces A: Physico-chemical and Engineering Aspects*, 508:230-239; Malik, I. A., Al-Mubaiyedh, U. A., Sultan, A. S., Kamal, M. S., & Hussein, I. A. (2016) Rheological and thermal properties of novel surfactant-polymer systems for EOR applications. *The Canadian Journal of Chemical Engineering*, 94:1693-1699; and Mohammed, M., & Babadagli, T. (2015) Wettability alteration: A comprehensive review of materials/methods and testing the selected ones on heavy-oil containing oil-wet systems. *Advances in Colloid and Interface Science*, 220:54-77].

Anionic and nonionic surfactants are the most common surfactants applied in EOR, suitable for performing surfactant flooding at low-temperature and low-salinity conditions. However, at high-temperature/high-salinity (HTHS) conditions, anionic surfactants with poor salt tolerance tend to phase separate. Carbonate reservoirs contain a large fraction of residual oil after primary and secondary recoveries. But anionic and nonionic surfactants are not applicable to EOR in a carbonate reservoir as they have high adsorption on carbonate rock. Therefore, there remains an apparent need for EOR chemicals (e.g. surfactants) and EOR methods suitable for HTHS carbonate reservoirs.

In view of the forgoing, one objective of the present disclosure is to provide a method of recovering hydrocarbons from an oil reservoir using a composition involving an enhanced oil recovery formulation that contains a zwitterionic surfactant and a copolymer and an aqueous solution. The enhanced oil recovery formulation exhibits good water solubility, high tolerance for salinity, and satisfactory oil recovery efficiency.

BRIEF SUMMARY OF THE INVENTION

According to one aspect, the present disclosure relates to a method of recovering hydrocarbons from a reservoir. The method involves injecting a composition containing an aqueous solution and an enhanced oil recovery formulation into the reservoir, and collecting hydrocarbons from the reservoir, wherein the enhanced oil recovery formulation contains a copolymer comprising reacted units of acrylamide and 2-acrylamido-2-methylpropane sulfonic acid, and a surfactant of formula (I)

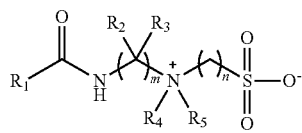

(I)

or a tautomer thereof, a stereoisomer thereof, or a mixture thereof, wherein (i) $R_1$ is an alkene selected from the group consisting of $CH_3(CH_2)_7CH=CH(CH_2)_6CH_2-*$, $CH_3(CH_2)_5CH=CH(CH_2)_8CH_2-*$, $CH_3(CH_2)_7CH=CH(CH_2)_{10}CH_2-*$, $CH_3(CH_2)_3CH=CH(CH_2)_6CH_2-*$, $CH_3(CH_2)_5CH=CH(CH_2)_6CH_2-*$, $CH_3(CH_2)_8CH=CH(CH_2)_3CH_2-*$, $CH_3(CH_2)_9CH=CH(CH_2)_6CH_2-*$, $CH_3(CH_2)_7CH=CH(CH_2)_8CH_2-*$, and $CH_3(CH_2)_7CH=CH(CH_2)_{12}CH_2-*$, (ii) $R_2$ and $R_3$ are independently selected from the group consisting of a hydrogen, an optionally substituted alkyl, and an optionally substituted cycloalkyl, (iii) $R_4$ and $R_5$ are independently selected from the group consisting of an optionally substituted alkyl, and an optionally substituted cycloalkyl, (iv) m is an integer in a range of 2-5, and (v) n is an integer selected from 3 and 4, and the enhanced oil recovery formulation is devoid of terpenes and ethylene glycol monobutyl ether.

In one embodiment, the aqueous solution is saline having a salinity of 10,000 ppm to 400,000 ppm.

In one embodiment, the aqueous solution is seawater having a salinity of 40,000 ppm to 80,000 ppm.

In one embodiment, the copolymer has a molar ratio of acrylamide to 2-acrylamido-2-methylpropane sulfonic acid in a range of 1:1 to 25:1.

In one embodiment, the copolymer has a mass average molecular weight in a range of 1,000-20,000 kDa.

In one embodiment, $R_1$ is selected from the group consisting of $CH_3(CH_2)_7CH=CH(CH_2)_6CH_2-*$, $CH_3(CH_2)_5CH=CH(CH_2)_8CH_2-*$, and $CH_3(CH_2)_7CH=CH(CH_2)_{10}CH_2-*$.

In one embodiment, $R_1$ is $CH_3(CH_2)_7CH=CH(CH_2)_6CH_2-*$.

In one embodiment, $R_2$ and $R_3$ are independently selected from the group consisting of a hydrogen and a methyl.

In one embodiment, $R_2$ and $R_3$ are a hydrogen.

In one embodiment, $R_4$ and $R_5$ are independently selected from the group consisting of a methyl, an ethyl, and an isopropyl.

In one embodiment, $R_4$ and $R_5$ are a methyl.

In one embodiment, m is 3.

In one embodiment, n is 3.

In one embodiment, the surfactant of formula (I) is

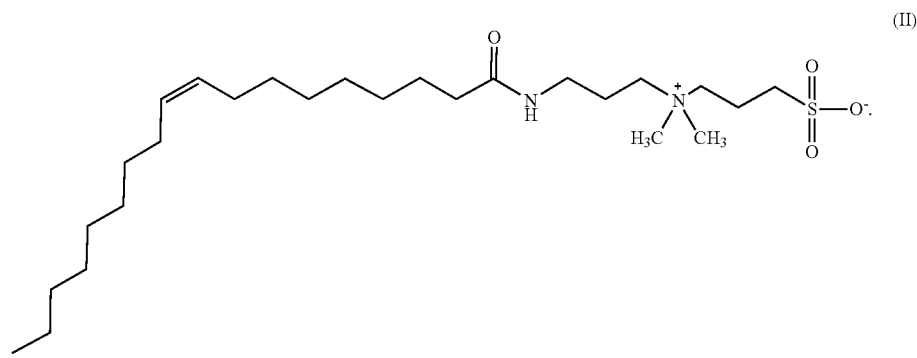

(II)

In one embodiment, the surfactant of formula (I) has a critical micelle concentration of $8 \times 10^{-5}$-$3 \times 10^{-4}$ mol/L in saline having a salinity of 10,000 ppm to 400,000 ppm at a temperature of 20-90° C.

In one embodiment, the surfactant of formula (I) is present in an amount of 0.01-0.2 wt % relative to a total weight of the composition.

In one embodiment, the copolymer is present in an amount of 0.1-1 wt % relative to a total weight of the composition.

In one embodiment, the reservoir has a temperature of 50-300° C.

In one embodiment, the reservoir is a carbonate reservoir.

In one embodiment, an amount of the hydrocarbons recovered is 20-50% greater than that of hydrocarbons recovered by a method performed in a substantially similar manner using a substantially similar composition that is devoid of the copolymer.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
FIG. 1A shows the structure of a surfactant having a saturated alkyl chain.

Embodiments of the present disclosure will now be described more fully hereinafter with reference to the accompanying drawings, in which some, but not all embodiments of the disclosure are shown.

The present disclosure will be better understood with reference to the following definitions. Unless otherwise specified, "a" or "an" means "one or more".

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), 10% of the stated value (or range of values), or +/−15% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the terms "compound" and "surfactant" are used interchangeably, and are intended to refer to a chemical entity, whether in the solid, liquid or gaseous phase, and whether in a crude mixture or purified and isolated.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation around the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyridyl, pyrimidiyl, and the like), substituted heterocyclyl and mixtures thereof and the like. The substituents may themselves be optionally substituted, and may be either unprotected, or protected as necessary, as known to those of ordinary skill in the art, for example, as taught in Greene, et al., "Protective Groups in Organic Synthesis", John Wiley and Sons, Second Edition, 1991, hereby incorporated by reference in its entirety.

As used herein, the term "alkyl" unless otherwise specified refers to both branched and straight chain saturated aliphatic primary, secondary, and/or tertiary hydrocarbons of typically $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "alkenyl" refers to a straight, branched, or cyclic hydrocarbon fragment containing at least one C=C double bond in either cis or trans conformation. Exemplary alkenyl groups include, without limitation, 1-propenyl, 2-propenyl (or "allyl"), 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, 1-heptenyl, 2-heptenyl, 3-heptenyl, 4-heptenyl, 5-heptenyl, 6-heptenyl, 1-octenyl, 2-octenyl, 3-octenyl, 4-octenyl, 5-octenyl, 6-octenyl, 7-octenyl, 1-nonenyl, 2-nonenyl, 3-nonenyl, 4-nonenyl, 5-nonenyl, 6-nonenyl, 7-nonenyl, 8-nonenyl, 1-decenyl, 2-decenyl, 3-decenyl, 4-decenyl, 5-decenyl, 6-decenyl, 7-decenyl, 8-decenyl, 9-decenyl, undecenyl, 8-dodecenyl, 8-heptadecenyl, 10-heptadecenyl, 12-heneicosenyl, 8-tridecenyl, 8-pentadecenyl, 5-pentadecenyl, 8-nonadecenyl, 10-nonadecenyl, and 14-tricosenyl.

According to one aspect, the present disclosure relates to a method of recovering hydrocarbons from a reservoir. The method involves injecting a composition containing an aqueous solution and an enhanced oil recovery formulation into the reservoir, and collecting hydrocarbons from the reservoir, wherein the enhanced oil recovery formulation contains a copolymer comprising reacted units of acrylamide and 2-acrylamido-2-methylpropane sulfonic acid, and a surfactant of formula (I)

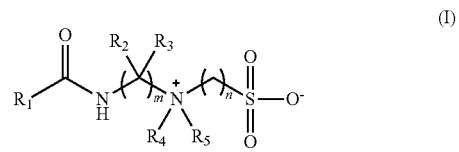

(I)

or a tautomer thereof, a stereoisomer thereof, or a mixture thereof. In at least one embodiment, the surfactant of formula (I) is zwitterionic (i.e. amphoteric) having both cationic (e.g. —N$^+$(R$_4$)(R$_5$)—) and anionic (e.g. —SO$_3^-$) groups within the same molecule.

R$_1$ is an optionally substituted C$_{8-30}$ alkenyl, preferably an optionally substituted C$_{10-28}$ alkenyl, preferably an optionally substituted C$_{12-26}$ alkenyl, preferably an optionally substituted C$_{14-24}$ alkenyl, preferably an optionally substituted C$_{16-22}$ alkenyl, preferably an optionally substituted C$_{18-20}$ alkenyl. The carbon counts described herein refers to a number of carbon atoms of the alkenyl group of R$_1$ which excludes the carbon atoms of optionally present substituents. In a preferred embodiment, R$_1$ is an unsubstituted alkenyl, preferably a linear alkenyl, preferably a linear C$_{8-30}$ alkenyl, preferably a linear C$_{10-28}$ alkenyl, preferably a linear C$_{12-26}$ alkenyl, preferably a linear C$_{14-24}$ alkenyl, preferably a linear C$_{16-22}$ alkenyl, preferably a linear C$_{18-20}$ alkenyl. Alternatively, R$_1$ is a branched alkenyl, such as CH$_3$(CH$_2$)$_7$CH=CHCH$_2$(CHCH$_3$)(CH$_2$)$_4$CH$_2$—*, and CH$_3$(CHCH$_3$)(CH$_2$)$_6$CH=CH(CH$_2$)$_6$CH$_2$—*.

Preferably, R$_1$ is not a saturated alkyl. In one or more embodiments, R$_1$ is an alkenyl having a degree of unsaturation of 1-5, 2-4, or 3. Most preferably, R$_1$ is an alkenyl having a degree of unsaturation of 1. In a preferred embodiment, R$_1$ is an alkenyl selected from the group consisting of CH$_3$(CH$_2$)$_7$CH=CH(CH$_2$)$_6$CH$_2$—*, CH$_3$(CH$_2$)$_5$CH=CH(CH$_2$)$_8$CH$_2$—*, CH$_3$(CH$_2$)$_7$CH=CH(CH$_2$)$_{10}$CH$_2$—*, CH$_3$(CH$_2$)$_3$CH=CH(CH$_2$)$_6$CH$_2$—*, CH$_3$(CH$_2$)$_5$CH=

CH(CH$_2$)$_6$CH$_2$—*, CH$_3$(CH$_2$)$_8$CH=CH(CH$_2$)$_3$CH$_2$—*, CH$_3$(CH$_2$)$_9$CH=CH(CH$_2$)$_6$CH$_2$—*, CH$_3$(CH$_2$)$_7$CH=CH(CH$_2$)$_8$CH$_2$—*, and CH$_3$(CH$_2$)$_7$CH=CH(CH$_2$)$_{12}$CH$_2$—*. In a more preferred embodiment, R$_1$ is selected from the group consisting of CH$_3$(CH$_2$)$_7$CH=CH(CH$_2$)$_6$CH$_2$—*, CH$_3$(CH$_2$)$_5$CH=CH(CH$_2$)$_8$CH$_2$—*, and CH$_3$(CH$_2$)$_7$CH=CH(CH$_2$)$_{10}$CH$_2$—*. In a most preferred embodiment, R$_1$ is CH$_3$(CH$_2$)$_7$CH=CH(CH$_2$)$_6$CH$_2$—*.

Non-limiting examples of alkenyl with a degree of saturation of 2 include CH$_3$(CH$_2$)$_4$CH=CHCH$_2$CH=CH(CH$_2$)$_6$CH$_2$—*, CH$_3$(CH$_2$)$_4$CH=CHCH$_2$CH=CH(CH$_2$)$_8$CH$_2$—*, and CH$_3$(CH$_2$)$_4$CH=CHCH$_2$CH=CH(CH$_2$)$_{10}$CH$_2$—*. Non-limiting examples of alkenyl with a degree of saturation of 3 include CH$_3$(CH$_2$CH=CH)$_3$(CH$_2$)$_6$CH$_2$—*, CH$_3$(CH$_2$)$_3$(CH$_2$CH=CH)$_3$(CH$_2$)$_3$CH$_2$—*, CH$_3$(CH$_2$)$_4$CH=CHCH$_2$CH=CH(CH$_2$)$_2$CH=CH(CH$_2$)$_2$CH$_2$—*, and CH$_3$(CH$_2$)$_3$(CH=CH)$_3$(CH$_2$)$_6$CH$_2$—*. Non-limiting examples of alkenyl with a degree of saturation of 4 include CH$_3$CH$_2$(CH=CHCH$_2$)$_4$(CH$_2$)$_2$CH$_2$—*, CH$_3$(CH$_2$)$_4$(CH=CHCH$_2$)$_4$CH$_2$CH$_2$—*, and CH$_3$CH$_2$(CH=CHCH$_2$)$_4$(CH$_2$)$_4$CH$_2$—*.

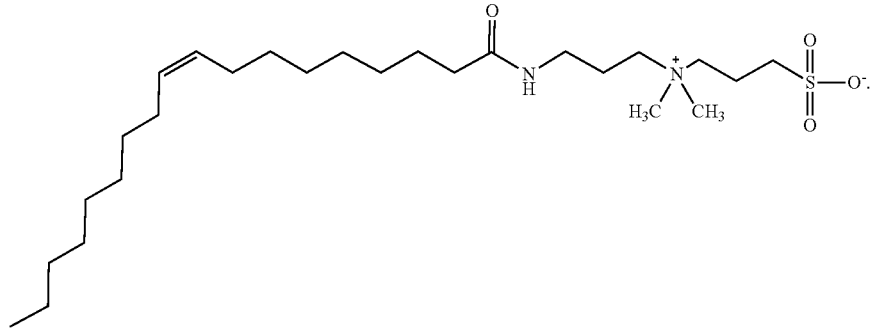

Non-limiting examples of alkenyl with a degree of saturation of 5 include CH$_3$CH$_2$(CH=CHCH$_2$)$_5$CH$_2$CH$_2$—*, CH$_3$(CH$_2$)$_4$(CH=CHCH$_2$)$_5$CH$_2$—*, and CH$_3$CH$_2$(CH=CHCH$_2$)$_5$(CH$_2$)$_3$CH$_2$—*.

Each double bond of R$_1$ may have substituents arranged in cis or trans conformation. In a preferred embodiment, the double bond of R$_1$ has substituents arranged in cis conformation. For example, when R$_1$ is CH$_3$(CH$_2$)$_7$CH=CH(CH$_2$)$_6$CH$_2$—*, it is understood that: R$_1$ is

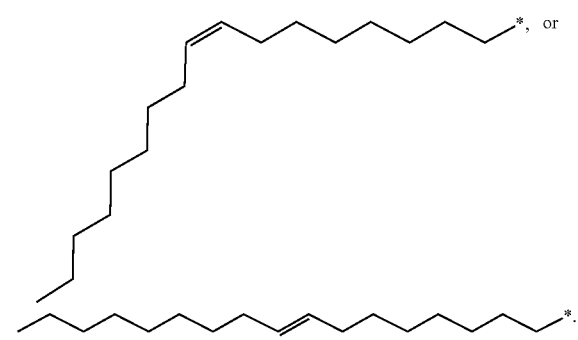

R$_2$ and R$_3$ are independently selected from the group consisting of a hydrogen, an optionally substituted alkyl, and an optionally substituted cycloalkyl. In one or more embodiments, R$_2$ and R$_3$ are independently selected from the group consisting of a hydrogen and a methyl. In a preferred embodiment, R$_2$ and R$_3$ are a hydrogen.

R$_4$ and R$_5$ are independently selected from the group consisting of an optionally substituted alkyl, and an optionally substituted cycloalkyl. In one or more embodiments, R$_4$ and R$_5$ are independently selected from the group consisting of a methyl, an ethyl, and an isopropyl. In a preferred embodiment, R$_3$ and R$_4$ are a methyl.

As used herein, the value of m denotes an alkyl chain of —C(R$_2$)(R$_3$)— groups of the surfactant of formula (I). In one or more embodiments, m is an integer in a range of 2-5, preferably 3-4. Most preferably, m is 3.

As used herein, the value of n denotes an alkyl chain of —CH$_2$— groups connected between —N$^+$(R$_4$)(R$_5$)— and —SO$_3^-$ groups of the surfactant of formula (I). In one or more embodiments, n is an integer selected from 3 and 4. In a preferred embodiment, n is 3.

In one or more embodiments, the surfactant of formula (I) is

Recent studies indicate that betaine-type zwitterionic surfactants might be used in harsh reservoir conditions because of their good salt tolerance and thermal stability [Kamal, M. S., Sultan, A. S., & Hussein, I. A. (2015) Screening of amphoteric and anionic surfactants for cEOR applications using a novel approach. *Colloids and Surfaces A: Physicochemical and Engineering Aspects*, 476:17-23, incorporated herein by reference in its entirety]. In addition, as a result of the low critical micelle concentration (CMC) of these surfactants, the amount of surfactant adsorbed onto carbonate rock surface was minimal [Zhang, F., Wang, Q., Zhu, Y., & Luo, W. (2013) A novel hydroxyl-propyl sulfobetaine surfactant for high temperature and high salinity reservoirs. In: *IPTC 2013: International Petroleum Technology Conference*, incorporated herein by reference in its entirety]. Carboxylic betaines have a narrow isoelectric range, whereas sulfobetaines retain zwitterionic characteristics over the entire pH range [Feng, Y., & Chu, Z. (2016) Correlating surface activity with structural and environmental parameters for alkylamidosulfobetaine surfactants. *Colloid and Polymer Science*, 294:957-963, incorporated herein by reference in its entirety]. Previous research work on surfactant for EOR application was focused on developing surfactants containing a saturated hydrophobic tail. However, investigation on surfactants bearing unsaturated tail for EOR was limited. The presence of unsaturated carbon-carbon double bonds in the tail of a surfactant may increase the solubility of the surfactant in aqueous solutions [Feng, Y., & Chu, Z.

(2016) Correlating surface activity with structural and environmental parameters for alkylamidosulfobetaine surfactants. *Colloid and Polymer Science*, 294:957-963, incorporated herein by reference in its entirety].

Figure 2:
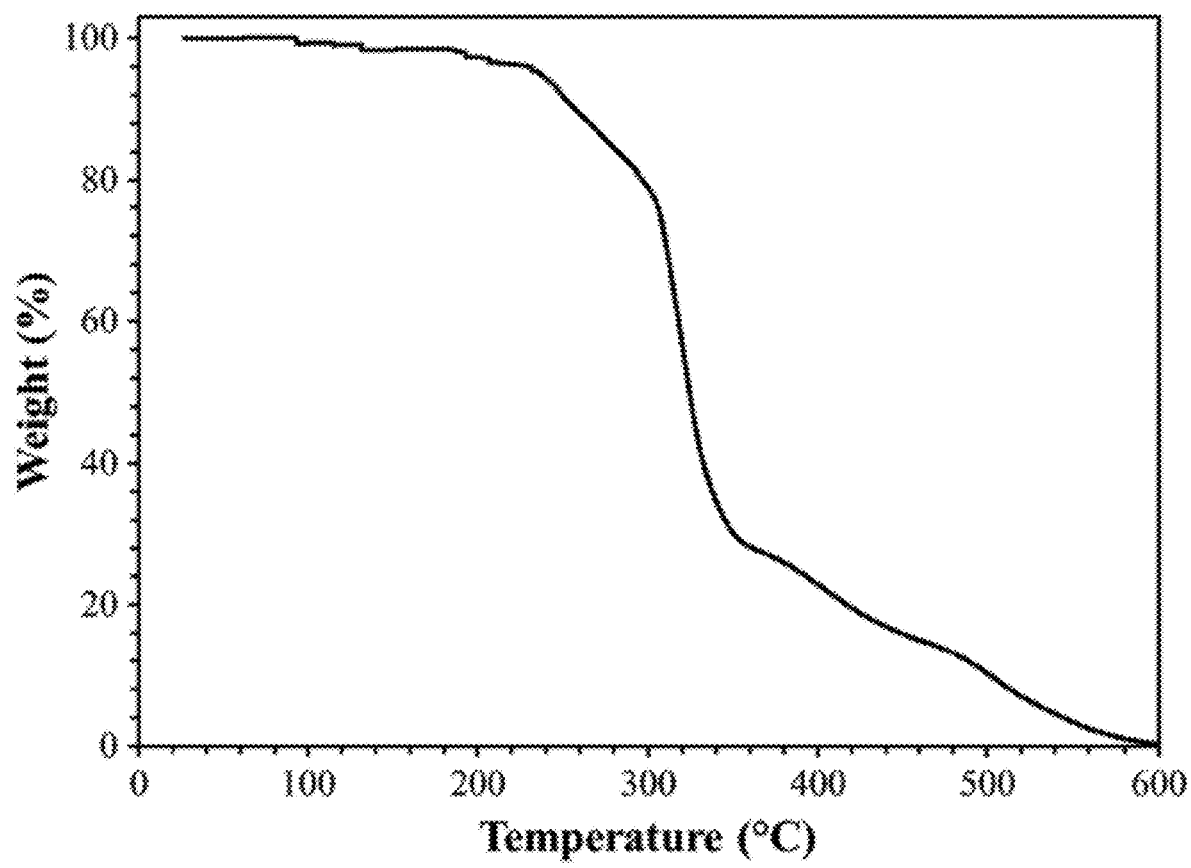
FIG. 2 is a thermal gravimetric analysis (TGA) curve of surfactant (II).
Figure 3A:
FIG. 3A is a photo showing a solution having surfactant (II) in seawater before aging.
Figure 3B:
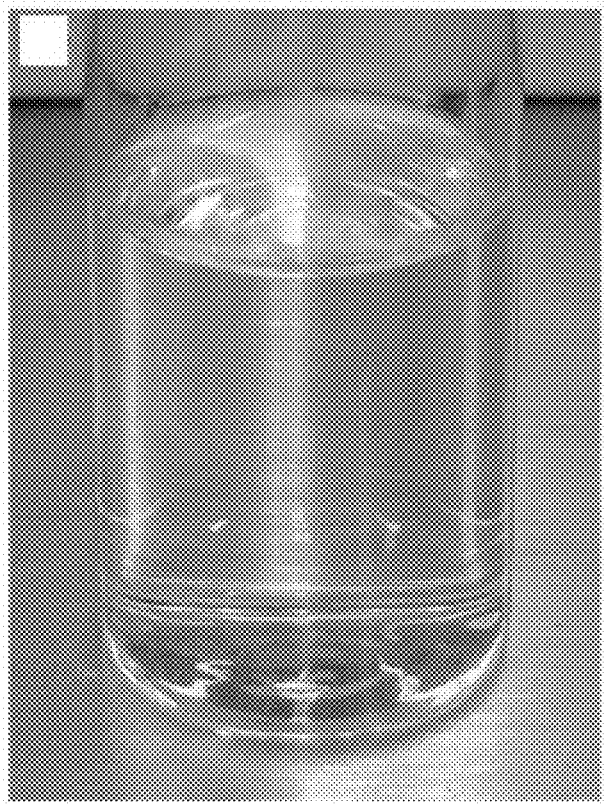
FIG. 3B is a photo showing a solution having surfactant (II) in seawater after aging at 90° C. for 15 days.

The surfactant of formula (I) exhibits good thermal stability at up to a temperature of 90-300° C., preferably 120-250° C., more preferably 180-220° C., which is a temperature that is 1.1-3 times, 1.5-2.8 times, or 2-2.5 times as actual reservoir temperature during oil recovery processes, for 1-30 days, preferably 5-20 days, more preferably 10-15 days without degradation (see FIGS. 2, and 3A-B).

As used herein, the term "water injection" or "waterflooding" refers to a method of oil recovery in which water or a fluid is injected into a petroleum reservoir to sweep and displace mobile oil from a subterranean geological formation. The water injected increases pressure within the reservoir, replenishing the natural reservoir pressure that has been previously depleted in primary recovery, and physically sweeps the displaced mobile oil to adjacent production wells. Generally, the water or fluid used in a waterflooding process is taken from nearby water sources, and is usually natural seawater, fresh water, produced water (byproduct of the oil industry), aquifer water, river water, artificial saline water or brine.

In one or more embodiments, the aqueous solution of the present disclosure acts as the fluid for recovering oil. In one embodiment, the aqueous solution is saline having a salinity of 10,000 ppm to 400,000 ppm, preferably 50,000 ppm to 300,000 ppm, more preferably 100,000-200,000 ppm. Minerals contained in saline used herein include, but are not limited to, sodium, calcium, magnesium, potassium, sulfate, chloride, bicarbonate, carbonate, bromide, and fluoride.

In a preferred embodiment, the aqueous solution is seawater having a salinity of 40,000 ppm to 80,000 ppm, preferably 50,000 ppm to 70,000 ppm, more preferably 55,000 ppm to 60,000 ppm. In one embodiment, the seawater is natural seawater or simulated seawater having sodium present at a concentration of 5-40 g/L, 10-30 g/L, or about 18 g/L, calcium present at a concentration of 0.25-2 g/L, 0.5-1.5 g/L, or about 0.7 g/L, magnesium present at a concentration of 0.5-4 g/L, 1-3 g/L, or about 2 g/L, sulfate present at a concentration of 2-8 g/L, 3-6 g/L, or about 4 g/L, chloride at a concentration of 15-60 g/L, 20-40 g/L, or about 30 g/L, and bicarbonate present at a concentration of 0.05-0.2 g/L, 0.08-0.15 g/L, or about 0.1 g/L, each relative to a total volume of the aqueous solution. In certain embodiments, when the aqueous solution is natural seawater, the solution may further contain microbial components and other organic pollutants that can be optionally removed prior to the oil recovery process.

In another preferred embodiment, the aqueous solution is formation water having a salinity of 100,000 ppm to 400,000 ppm, preferably 150,000 ppm to 300,000 ppm, more preferably 200,000 ppm to 250,000 ppm. In one embodiment, the formation water is natural formation water or simulated formation water having sodium present at a concentration of 30-100 g/L, 50-80 g/L, or about 60 g/L, calcium present at a concentration of 8-40 g/L, 15-30 g/L, or about 20 g/L, magnesium present at a concentration of 1-5 g/L, 2-4 g/L, or about 2.5 g/L, sulfate present at a concentration of 0.1-1 g/L, 0.2-0.6 g/L, or about 0.4 g/L, chloride at a concentration of 60-200 g/L, 100-160 g/L, or about 130 g/L, and bicarbonate present at a concentration of 0.1-1 g/L, 0.2-0.5 g/L, or about 0.4 g/L, each relative to a total volume of the solution.

In one or more embodiments, the surfactant of formula (I) is soluble in the aforementioned aqueous solution (e.g. seawater, formation water) at a temperature of 4-95° C., 10-90° C., 20-80° C., 30-60° C., or 40-50° C. As used herein, critical micelle concentration (CMC) refers to the concentration of surfactants above which micelles form. The value of the CMC for a given dispersant in a given medium depends on temperature, pressure, and on the presence of other surface active substances and electrolytes. In one embodiment, the surfactant of formula (I) has a critical micelle concentration of $8\times10^{-5}$-$3\times10^{-4}$ mol/L, $1\times10^{-4}$-$2.5\times10^{-4}$ mol/L, or $1.5\times10^{-4}$-$2\times10^{-4}$ mol/L in saline having a salinity of 10,000 ppm to 400,000 ppm, preferably 50,000 ppm to 300,000 ppm, more preferably 100,000-200,000 ppm at a temperature of 4-95° C., 10-90° C., 20-80° C., 30-60° C., or 40-50° C. In one related embodiment, the surfactant of formula (I) has a critical micelle concentration of $9\times10^{-5}$-$2.5\times10^{-4}$ mol/L, $1\times10^{-4}$-$2.2\times10^{-4}$ mol/L, or $1.8\times10^{-4}$-$2\times10^{-4}$ mol/L in the aforementioned seawater at a temperature of 10-90° C., 20-60° C., or 30-50° C. In another related embodiment, the surfactant of formula (I) has a critical micelle concentration of $1\times10^{-4}$-$2\times10^{-4}$ mol/L, $1.2\times10^{-4}$-$1.8\times10^{-4}$ mol/L, or $1.5\times10^{-4}$-$1.6\times10^{-4}$ mol/L in the aforementioned formation water at a temperature of 20-95° C., 40-80° C., or 50-60° C. (see Table 2).

Surfactant flooding increases oil production by reducing the IFT between oil and the displacing fluid. Surfactants may improve rock wettability, allow water to move faster, and ultimately enhance oil displacement [Sofia, S. J. D., Sharifi, M., & Sarapardeh, A. H. (2016) Toward mechanistic understanding of natural surfactant flooding in enhanced oil recovery processes: The role of salinity, surfactant concentration and rock type. *Journal of Molecular Liquids*, 222: 632-639, incorporated herein by reference in its entirety]. On the other hand, polymers may increase the viscosity of the injected water and enhance the sweep efficiency by decreasing the mobility ratio [Abidin, A., Puspasari, T., & Nugroho, W. (2012) Polymers for enhanced oil recovery technology. *Procedia Chemistry*, 4:11-16, incorporated herein by reference in its entirety].

As used herein, monomers are molecules which can undergo polymerization, thereby contributing constitutional repeating units to the structures of a macromolecule or polymer. The process by which monomers combine end to end to form a polymer is referred to herein as "polymerization". As used herein, a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc.

The enhanced oil recovery formulation further comprises at least one polymer or copolymer selected from the group consisting of a copolymer involving reacted units of acrylamide (AM) and 2-acrylamido-2-methylpropane sulfonic acid (AMPS), poly 2-acrylamido-2-methylpropane-sulfonic acid (polyAMPS), polyacrylamide, partially-hydrolyzed polyacrylamide, a terpolymer involving reacted units of acrylamide, 2-acrylamido-2-methyl-1-propanesulfonic acid, and N-vinylpyrrolidone, and Xanthan gum.

Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively. Statistical copolymers are copolymers in which the sequence of monomer residues follows a statistical rule. That is, the probability of finding a particular monomer residue at a particular point in the chain is equal to the mole fraction of that monomer residue in the chain. The statistical copolymer may be referred to as a truly random copolymer. The copolymer of the present disclosure may be a block copolymer (e.g. a block bipolymer) or a random copolymer (e.g. a random bipolymer).

Preferably, the enhanced oil recovery formulation contains a copolymer involving reacted units of acrylamide (AM) and 2-acrylamido-2-methylpropane sulfonic acid (AMPS), which is also referred to as "AM-AMPS copolymer". 2-Acrylamido-2-methylpropane sulfonic acid (AMPS) was a Trademark name by The Lubrizol Corporation. AMPS is a reactive, hydrophilic, sulfonic acid acrylic monomer used to alter the chemical properties of wide variety of anionic polymers. AM is a water soluble monomer used to manufacture various polymers, especially polyacrylamide. Other monomers that may be included in addition to or in lieu of AM to the copolymer used herein include, but are not limited to, methacrylamide, N-methylacrylamide, N-methylmethacrylamide, diacetone acrylamide, dimethylaminopropylmethacrylamide, isopropylaminopropyl methacrylamide, acrylic acid, methacrylic acid, itaconic acid, and maleic acid.

In one or more embodiments, the copolymer has a molar ratio of acrylamide to 2-acrylamido-2-methylpropane sulfonic acid in a range of 1:1 to 25:1, preferably 1:2 to 22:1, preferably 1:3 to 20:1, preferably 1:4 to 19:1, preferably 1:5 to 17:1, preferably 1:6 to 15:1, preferably 1:7 to 12:1, preferably 1:8 to 10:1. However, in certain embodiments, the molar ratio of acrylamide to 2-acrylamido-2-methylpropane sulfonic acid may be less than 1:1 or greater than 25:1. In some embodiments, the copolymer has 2-acrylamido-2-methylpropane sulfonic acid (AMPS) content in an amount of 3 mol % to 40 mol %, 5 mol % to 35 mol %, 8 mol % to 30 mol %, or 10 mol % to 20 mol % relative to a total amount of the monomers (e.g. acrylamide and AMPS).

In one or more embodiments, the copolymer used herein has a mass average molecular weight in a range of 1,000-20,000 kDa, preferably 2,000-15,000 kDa, preferably 3,000-10,000 kDa, preferably 4,000-9,500 kDa, preferably 5,000-9,000 kDa, preferably 6,000-8,500 kDa, preferably 7,000-8,000 kDa.

The copolymer of the present disclosure may be synthesized via procedures known to those of ordinary skill in the art. For example, the copolymer may be prepared through a radical polymerization of AM and AMPS using a radical initiator such as potassium persulfate. Alternatively, the copolymer used herein may be available from commercial vendors such as SNF Floerger (France).

In a preferred embodiment, the surfactant of formula (I) is present in an amount of 0.01-0.2 wt %, preferably 0.02-0.15 wt %, preferably 0.025-0.1 wt %, preferably 0.03-0.075 wt %, preferably 0.035-0.05 wt %, preferably 0.04-0.045 wt %, relative to a total weight of the composition. However, in certain embodiments, the surfactant of formula (I) may be present in an amount that is less than 0.01 wt % or greater than 0.2 wt % relative to a total weight of the composition.

In a preferred embodiment, the copolymer is present in an amount of 0.1-1 wt %, preferably 0.15-0.8 wt %, preferably 0.2-0.6 wt %, preferably 0.25-0.5 wt %, preferably 0.3-0.45 wt %, preferably 0.35-0.4 wt %, relative to a total weight of the composition. However, in certain embodiments, the surfactant of formula (I) may be present in an amount that is less than 0.01 wt % or greater than 0.2 wt % relative to a total weight of the composition.

Terpenes are a class of organic compounds produced by plants, particularly conifers, and by some insects. Terpenes may be generally classified as monoterpenes (e.g., having two isoprene units), sesquiterpenes (e.g., having 3 isoprene units), diterpenes, or the like. Terpenes may also refer to terpenoid which includes natural degradation products, such as ionones, and natural and synthetic derivatives, e.g., terpene alcohols, aldehydes, ketones, acids, esters, epoxides, and hydrogenation products. Non-limiting examples of terpene include linalool, geraniol, nopol, α-terpineol, menthol, eucalyptol, menthone, d-limonene, terpinolene, β-occimene, γ-terpinene, α-pinene, and citronellene. Certain terpenes such as limonene (e.g. d-limonene) are used as a solvent for oils.

As used herein, "soluble" refers to forming a homogeneous mixture when at least one solid and at least one liquid are mixed together. The surfactant of formula (I) and the copolymer are soluble in the aqueous solution at the reservoir temperature (e.g. above 50° C.). A homogeneous composition may be obtained by mixing the surfactant of formula (I) and the copolymer in the presence of the aqueous solution without additional organic solvents and without the need for a hydrocarbon based phase such as a diesel emulsion. In other words, no additional organic solvents are required to improve the compatibility of the surfactant and the copolymer in the aqueous solution.

In some embodiments, the composition used herein comprises substantially no terpenes, for instance, less than 0.1 wt % of terpenes, preferably less than 0.05 wt %, more preferably less than 0.01 wt % of terpenes, relative to a total weight of the composition. In at least one embodiment, the composition used herein is devoid of terpenes. In a preferred embodiment, the composition used herein is devoid of terpenes including α-terpeneol, α-pinene, nopol, and eucalyptol. In another embodiment, the composition used herein comprises substantially no ethylene glycol monobutyl ether, for instance, less than 0.1 wt % of ethylene glycol monobutyl ether, preferably less than 0.05 wt %, more preferably less than 0.01 wt % of ethylene glycol monobutyl ether, relative to a total weight of the composition. In at least one embodiment, the composition used herein is devoid of ethylene glycol monobutyl ether.

"Hydrocarbons", "petroleum", "crude oil", or "oil" may be used interchangeably to refer to carbonaceous material originating from subterranean sources as well as synthetic hydrocarbon products, including organic liquids or gases, kerogen, bitumen, crude oil, natural gas or from biological processes, that is principally hydrogen and carbon, with significantly smaller amounts (if any) of heteroatoms such as nitrogen, oxygen and sulfur, and, in some cases, also containing small amounts of metals. Crude oil (e.g., liquid petroleum) and natural gas (e.g., gaseous petroleum) are both hydrocarbons.

As used herein, the terms "reservoir", "oil reservoir" and "petroleum reservoir" refer to a component of a petroleum system (i.e. hydrocarbon or petroleum-generating and storing geologic system) that is composed of a subsurface body of rock formations having sufficient porosity and permeability to store and transmit fluids. Sedimentary rocks are the most common reservoir rocks because they have more porosity than most igneous and metamorphic rocks and form under temperature conditions at which hydrocarbons can be preserved. Depending on the type of sedimentary rock, reservoirs can be classified as carbonate reservoirs having predominantly limestones, and sandstone reservoirs having primarily siliclastic rocks and clay. In one embodiment, the reservoir is a carbonate reservoir, or a sandstone reservoir. In a preferred embodiment, the reservoir is a carbonate reservoir. Alternatively, the reservoir is a tight shale reservoir formed by hydraulic fracturing.

As used herein, the terms "bore" and "wellbore" refer to a drilled hole or borehole of a reservoir, including the open hole or uncased portion of the well. In some embodiments, a borehole refers to the inside diameter of the wellbore wall, the rock face that bounds the drilled hole. Depending on the embodiment, a wellbore can be used for injection, production, or both.

The present disclosure provides a method of recovering hydrocarbons from a petroleum reservoir. The composition containing the enhanced oil recovery formulation (e.g. the surfactant of formula (I) and the copolymer) used herein may substantially increase the yield of hydrocarbons from underground reservoirs when injected and are particularly useful for increasing yield of hydrocarbons in reservoirs comprising high temperature water sources, high salinity water sources, or high temperature/high salinity water sources including from carbonate reservoirs. In one or more embodiments, the reservoir has a temperature of 50-300° C., 75-250° C., 100-200° C., or 150-180° C. In a related embodiment, the reservoir has a pressure of 100-3,000 psi, 200-2,500 psi, 400-2,000 psi, 800-1,500 psi, or 1,000-1,200 psi.

The method of the present disclosure involves injecting the composition containing the aforementioned aqueous solution and enhanced oil recovery formulation including the copolymer comprising reacted units of acrylamide and 2-acrylamido-2-methylpropane sulfonic acid, and the surfactant of formula (I) into the reservoir, and collecting hydrocarbons from the reservoir.

The method of recovering hydrocarbons may be performed by injecting the composition into a first wellbore (e.g. an injection wellbore) connected to the reservoir and then collecting hydrocarbons from a second wellbore (e.g. a production wellbore) that is connected to the reservoir. Alternatively, the method may be performed by injecting the composition into a wellbore connected to the reservoir, and then collecting hydrocarbons from the same wellbore. Injection pressures and flow rates of the composition may be kept constant or varied. In one embodiment, the injection pressure of the composition is up to 5,000 psi, preferably 50-3,000 psi, preferably 100-1,000 psi. In a related embodiment, the injection flow rate of the composition is 0.1-50 mL/min, preferably 0.5-20 mL/min, preferably 1-10 mL/min.

In some embodiments, the composition for injection is prepared by pre-mixing the surfactant of formula (I) and the copolymer with the aqueous solution that is taken from nearby water sources or prepared on site during oil recovery operations prior to the injection. In an alternative embodiment, the enhanced oil recovery formulation (e.g. the surfactant of formula (I) and the copolymer) may be injected simultaneously with the aqueous solution, such as seawater, formation water, and produced water, into the reservoir in an amount sufficient to produce the composition in situ. In another alternative embodiment, components of the enhanced oil recovery formulation may be injected sequentially (e.g. the copolymer is injected after the injection of the surfactant of formula (I)) with the aqueous solution into the reservoir.

As used herein, the term "pore volume" or "PV" refers to the total volume in a reservoir that can be occupied by fluids. This term is also used as a measurement unit referring to the amount of fluid such as chemical fluid or aqueous solution that is injected into a reservoir during secondary and tertiary recoveries.

The method disclosed herein may be particularly suitable for supplementing primary (natural) and secondary recoveries. For example, an oil recovery process may include an initial flooding of a reservoir with 0.5-3 pore volumes (PVs) of water which may be natural seawater, fresh water, produced water, aquifer water, river water, artificial saline water or brine (waterflooding), followed by at least a single injection of the composition according to the method described herein. The amount of composition injected may be 1-5 pore volumes, preferably 2-4.5 pore volumes, more preferably 3-4 pore volumes. The initial waterflooding may recover up to 40% of a reservoir's original oil in place, preferably 5-37%, more preferably 10-30%. The method of the present disclosure that injects the reservoir with the composition may recover a further 20-40% of the reservoir's original oil in place, preferably 22-35%, preferably 25-30% (see FIG. 9).

The hydrocarbons may be collected and separated from the injected composition at a fluids processing facility using fluids separation reagents such as emulsion breakers and water clarifiers. It is worth noting that the copolymer present in the composition synergistically boosts oil recovery performance of the currently disclosed method. In one or more embodiment, an amount of the hydrocarbons recovered is 20-50% greater than that of hydrocarbons recovered by a method performed in a substantially similar manner using a substantially similar composition that is devoid of the copolymer, preferably 25-45% greater, preferably 30-40% greater than that of hydrocarbons recovered by a method performed in a substantially similar manner using a substantially similar composition that is devoid of the copolymer (see FIG. 9).

The examples below are intended to further illustrate protocols for preparing, characterizing the surfactant of formula (I), the composition, and uses thereof, and are not intended to limit the scope of the claims.

EXAMPLE 1

Materials

Figure 1B:
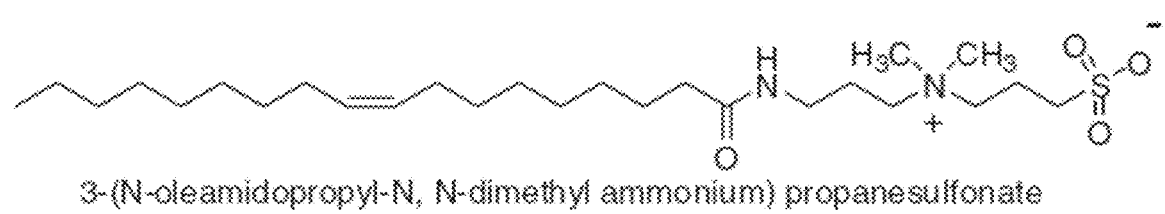
FIG. 1B shows the structure of a surfactant of formula (I) having an unsaturated alkenyl chain (i.e. surfactant (II)).
Figure 1C:
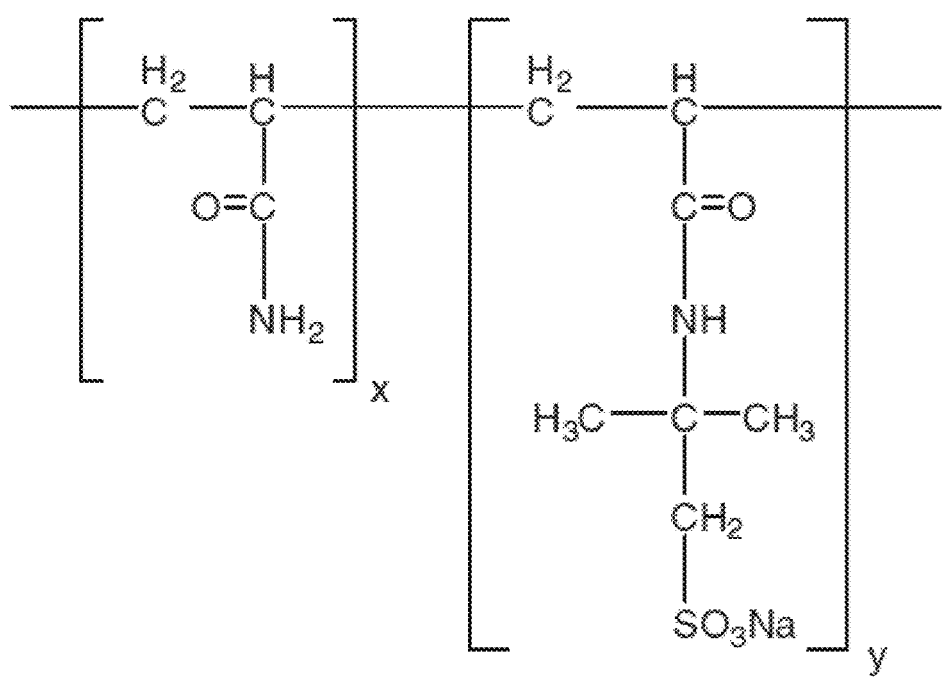
FIG. 1C shows the structure of acrylamide and 2-acrylamido-2-methylpropane sulfonic acid (AM-AMPS) copolymer.

The zwitterionic surfactants 3-(N-stearamidopropyl-N,N-dimethylammonium)propanesulfonate and 3-(N-oleamidopropyl-N,N-dimethylammonium) propane sulfonate were synthesized by the procedure reported by Feng et al. [Chu, Z., & Feng, Y. (2009) A facile route towards the preparation of ultra-long-chain amidosulfobetaine surfactants. *Synlett*, 16: 2655-2658, incorporated herein by reference in its entirety]. Stearic acid (99%, biochemical), oleic acid (92%, biochemical), sodium fluoride (ACS reagent, ≥99%, Sigma Aldrich, USA), 3-(dimethylamino)-1-propylamine (99%, GC, Aldrich, USA), 1,3-propanesultone (98%, GC, Aldrich, USA), and aluminum oxide (Fluka, Sigma Aldrich, USA) were used as obtained. Distilled solvents were used for the synthesis of the zwitterionic surfactants. The AM-AMPS copolymer was used to evaluate the unsaturated surfactant—polymer interactions. The polymer was supplied by SNF Floerger (France) and had a molecular weight of 8 million Da and a degree of anionicty of 25%. The structures of the synthesized zwitterionic surfactants and the commercial copolymer are given in FIGS. 1A-C.

Synthetic seawater (SW) and formation water (FW) were prepared using NaCl, $Na_2SO_4$, $NaHCO_3$, $CaCl_2$, and $MgCl_2$.

All the salts were obtained from Sigma-Aldrich, USA. The concentrations of different ions in SW and FW are provided in Table 1.

TABLE 1

Composition of brines used in the disclosure

| Ions | Formation water (FW) (g L$^{-1}$) | Seawater (SW) (g L$^{-1}$) |
|---|---|---|
| Sodium | 59.5 | 18.3 |
| Calcium | 19.1 | 0.7 |
| Magnesium | 2.5 | 2.1 |
| Sulfate | 0.4 | 4.3 |
| Chloride | 132.1 | 32.2 |
| Bicarbonate | 0.4 | 0.1 |
| Total | 214 | 57.7 |

The crude oil used was obtained from the Uthmaniyah oil field and had a density and viscosity of 0.8725 g cm$^{-3}$ and 13.1 cP, respectively. API gravity and molecular weight of the oil were 30 and 251 g mol$^{-1}$, respectively. SARA analysis of the oil revealed that it contained 50% aromatics, 36% saturates, and 11% resins, with the rest being asphaltenes.

EXAMPLE 2

Characterizations

The short-term thermal stability of the unsaturated surfactant was assessed using thermogravimetric analysis (TGA). The thermal stability for a longer period (2 weeks) was determined by FTIR and NMR. The synthesized unsaturated surfactant was dried and heated at 10° C./min in an SDT-Q600 instrument (TA Instruments) from room temperature to 600° C. under nitrogen atmosphere. The thermal stability for a longer period was determined by aging 1 wt % aqueous solution of the unsaturated surfactant at 90° C. for 15 days. FTIR, $^{13}$C NMR, and $^1$H NMR were used to identify the structural changes in the unsaturated surfactant after aging. A Nicolet 6700 spectrometer was used for FTIR analysis of the unsaturated surfactant, while a JEOL 500 MHz spectrometer was used for obtaining the NMR spectra.

The surface tension of the unsaturated surfactant in SW and FW at different temperatures was analyzed using a Biolin Scientific Attension instrument. The pendant-drop technique was used to measure the surface tension at 30° C. and 60° C. Other surface properties such as CMC, surface tension at CMC ($\gamma_{cmc}$), surfactant ability at lower surface tension ($\pi_{cmc}$), maximum surface access ($\Gamma_{max}$), and minimum area per molecule ($A_{min}$) were also obtained from the surface tension data. These surface properties were calculated using Eqs. 1-3, $$\pi_{cmc} = \gamma_0 - \gamma_{cmc} \quad (1)$$

$$\Gamma_{max} = -\frac{1}{nRT}\left(\frac{d\gamma}{d\ln C}\right)_T \quad (2)$$

$$A_{min} = 10^{18}/N_A \Gamma_{max} \quad (3)$$

where $\gamma_0$ is the surface tension of the brine (FW or SW), $N_A$ is the Avogadro number, $d\gamma/d\ln C$ is the slope below CMC in the surface tension plot, C is the surfactant concentration in brine, T is temperature, R is the gas constant, and n=1 for zwitterionic surfactants [Wang, Y., Zhang, Y., Liu, X., Wang, J., Wei, L., & Feng, Y. (2014) Effect of a hydrophilic head group on Krafft temperature, surface activities and rheological behaviors of Erucyl Amidobetaines. *Journal of Surfactants and Detergents,* 17:295-301—incorporated herein by reference]. The interfacial tension between crude oil and water was measured using a spinning drop tensiometer from Kruss (SITE 100). All the reported points are the average equilibrium values.

Rheological properties of the unsaturated SP solutions were measured using a Discovery Hybrid rheometer (DHR-3) from TA Instruments. The concentric cylinder geometry with a cup diameter of 30.43 mm and a bob diameter of 28 mm was used. The geometry was equipped with a vapor trap to minimize the liquid loss by evaporation. A maximum temperature of 80° C. was used for rheological characterization to further avoid vaporization. Steady shear experiments were performed over a shear rate range of 0.1 to 1000 s$^{-1}$, while the dynamic experiments were carried using within the frequency range 0.1-100 rad s$^{-1}$.

Oil recovery experiments were performed using Indiana limestone core obtained from Kocurek Industries Inc, USA. The length and diameter of the core were 30.48 and 3.81 cm, respectively. The pore volume (PV), porosity, and permeability of the sample were 64.25 cm$^3$, 15.94%, and 70 mD, respectively. The core sample was weighed and saturated with FW at 2000 psi for 48 h. The mass of the core was determined after saturation to calculate the PV and porosity. The core was transferred to a core holder in order to measure the permeability of the core by injecting FW. After the permeability measurement, the core was saturated with oil and aged at 90° C. for 3 weeks. Oil recovery experiments were performed by injecting brine (SW) and the unsaturated surfactant solution at 0.5 mL min$^{-1}$. The brine and the unsaturated surfactant solutions were injected till stable ΔP was obtained. The confining pressure was 2000 psi, while the back pressure was set at 500 psi.

EXAMPLE 3

Thermal Stability

Solubility and compatibility of the surfactant in the reservoir and injection brine are the primary considerations for further evaluation of the unsaturated surfactant for EOR application. If the surfactant is not soluble in the seawater and formation brine, it can be rejected at the initial stage. The synthesized surfactant bearing a saturated C18 hydrophobic tail exhibited poor solubility in the SW and FW; therefore, it was not evaluated further. However, the synthesized surfactant bearing an unsaturated C18 hydrophobic tail showed excellent solubility in the SW and FW. Further, no precipitation or phase separation was observed when the synthesized unsaturated surfactant was dissolved in SW (57,643 ppm) and FW (213,734 ppm). After the compatibility test with SW and FW, the short-term thermal stability of the synthesized unsaturated surfactant was evaluated using TGA analysis. FIG. 2 shows the thermogram of the synthesized unsaturated surfactant obtained at the heating rate of 10° C. min$^{-1}$. Only 3% weight loss was observed up to 200° C., which was mainly associated with solvent and water evaporation. The major weight loss started after 225° C., which indicated that the degradation temperature was much higher than actual field conditions (90° C.). TGA results helped to identify and eliminate the surfactants that had lower decomposition temperatures. However, for real field applications, long-term thermal stability of the surfactant must be considered, as the surfactant residence time in the reservoir could vary from a few days to a few months.

Figure 4:
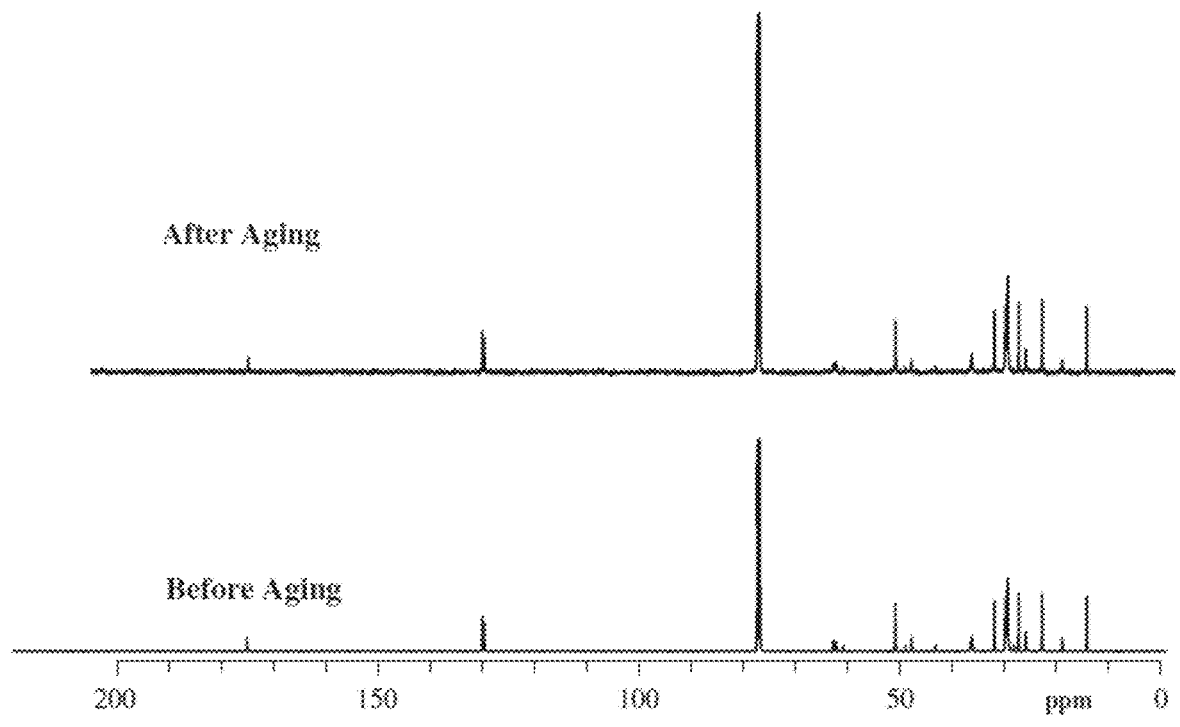
FIG. 4 is an overlay of $^{13}C$ NMR spectra of surfactant (II) before and after aging at 90° C.
Figure 5:
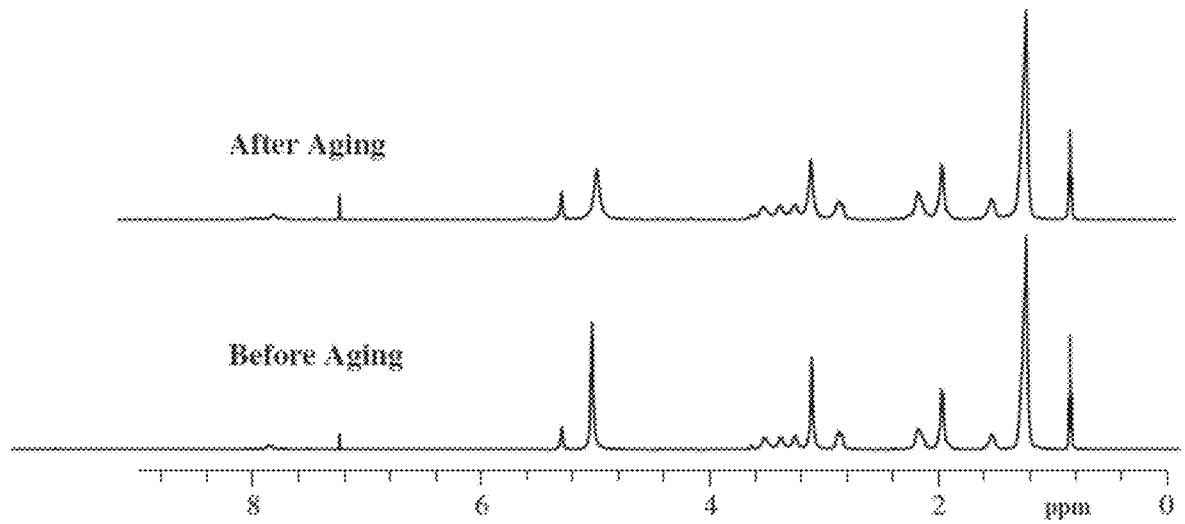
FIG. 5 is an overlay of $^1H$ NMR spectra of surfactant (II) before and after aging at 90° C.
Figure 6:
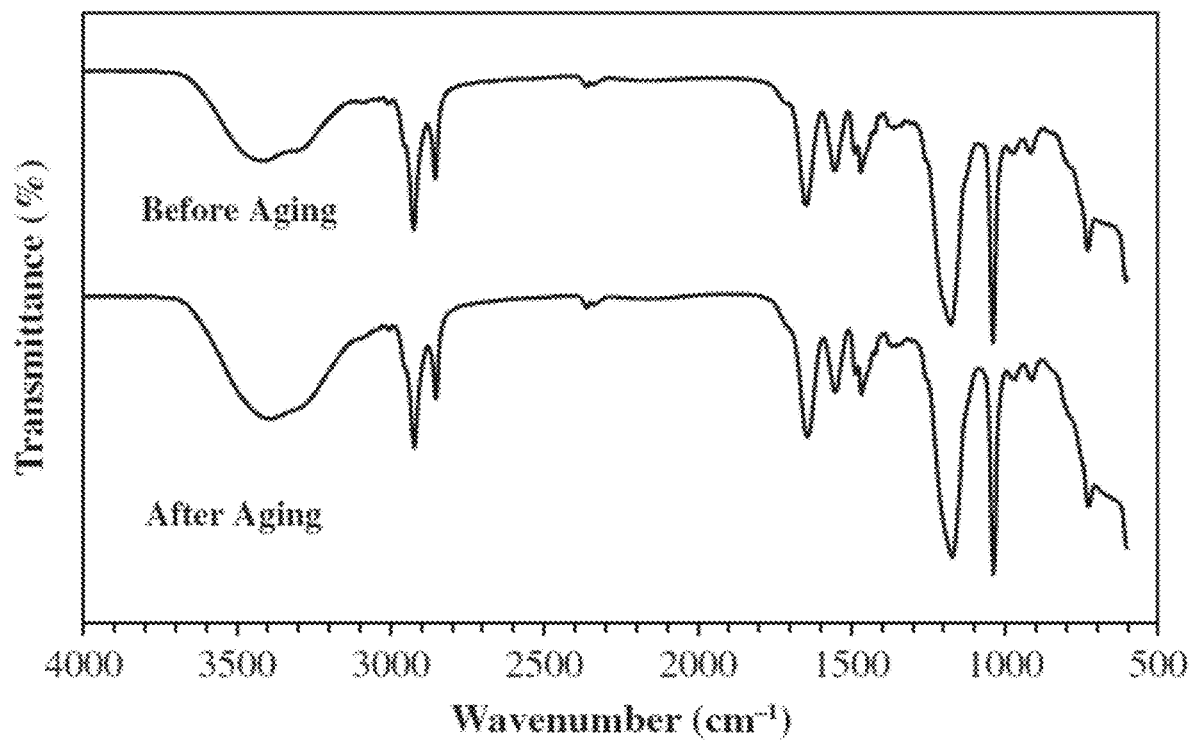
FIG. 6 is an overlay of FTIR spectra of surfactant (II) before and after aging at 90° C.

For long-term thermal stability, 1 wt % surfactant solution was aged in sealed aging tubes at 90° C. for 15 days. After 15 days of aging, the unsaturated surfactant solution remained clear and there was no phase separation or precipitation, as depicted in FIG. 3B. The $^{13}$C-NMR spectra of the unsaturated surfactant before aging (FIG. 4) exhibited the terminal methyl carbon at δ=14.1 ppm [CH$_3$—(CH$_2$)$_n$—], and the methylene carbons [CH$_3$—(CH$_2$)$_n$—] in the unsaturated surfactant tail resonated at δ=22.7-36.4 ppm. The two methyl carbons directly attached to the quaternary nitrogen [—CH$_2$—N$^+$—(CH$_3$)$_2$—CH$_2$—] were detected at δ=50.8 ppm and the two methylene carbons directly attached to quaternary nitrogen [—CH$_2$—N$^+$—(CH$_3$)$_2$—CH$_2$—] at δ=62.2 and δ=62.7 ppm. The olefinic carbons in the unsaturated surfactant tail appeared at δ=129.6 and δ=130.0 ppm. The amide carbonyl group [—CH$_2$—C=O—NH] resonated at δ=175.1 ppm. The peaks appearing in the $^{13}$C-NMR spectra of the sample agreed with the proposed structure of the unsaturated surfactant. The $^{13}$C-NMR spectra of the sample after aging (FIG. 4) revealed the existence of methyl carbon [—(CH$_2$)$_n$—CH$_3$] at the end of the hydrophobic tail at δ=14.1 ppm. The methylene carbons of the hydrophobic tail [—(CH$_2$)$_n$—CH$_3$)] also appeared at δ=22.6-36.3 ppm. The olefinic carbons in the hydrophobic tail resonated at δ=129.6 ppm and δ=129.9 ppm. The carbons of two methyl groups connected with the central positively charged nitrogen [—CH$_2$—N$^+$(CH$_3$)$_2$—CH$_2$—] still present in the aged sample and were detected at δ=50.8 ppm. Similarly, the carbons of two methylene groups attached to the central positively charged nitrogen [—CH$_2$—N$^+$(CH$_3$)$_2$—CH$_2$—] were also detected at δ=62.2 and δ=62.7 ppm. The carbonyl carbon (—CH$_2$—C=O—NH—) was observed at δ=174.9 ppm. In the $^1$H-NMR spectrum of the unsaturated surfactant before aging (FIG. 5), the terminal methyl protons [—(CH$_2$)$_n$—CH$_3$)] was detected at δ=0.84 ppm and the methylene protons [—(CH$_2$)$_n$—CH$_3$)] in the unsaturated surfactant tail resonated at δ=1.23 ppm. The protons of two methyl groups connected to the quaternary nitrogen [—CH$_2$—N(CH$_3$)$_2$—CH$_2$—] revealed the peak at δ=3.10 ppm, and the protons of two methylene groups joined with the quaternary nitrogen [—CH$_2$—N(CH$_3$)$_2$—CH$_2$—] appeared at δ=2.86 and δ=3.25 ppm. The olefinic protons in the unsaturated surfactant tail [—CH$_2$—CH=CH—CH$_2$—] resonated at δ=5.30 ppm, the allylic protons (—C=C—C—H) appeared at δ=1.96 ppm, and the amide proton [—CH$_2$—C=O—NH—] was observed at δ=7.85 ppm, which further confirmed the formation of the zwitterionic surfactant. An additional peak observed at δ=5.03 ppm in the sample before aging and at δ=4.82 ppm after aging corresponds to the residual water peak [Fulmer, G. R., Miller, A. J., Sherden, N. H., Gottlieb, H. E., Nudelman, A., Stoltz, B. M., . . . Goldberg, K. I. (2010) NMR chemical shifts of trace impurities: Common laboratory solvents, organics, and gases in deuterated solvents relevant to the organometallic chemist. *Organometallics*, 29:2176-2179; and Gottlieb, H. E., Kotlyar, V., & Nudelman, A. (1997) NMR chemical shifts of common laboratory solvents as trace impurities. *The Journal of Organic Chemistry*, 62:7512-7515—each incorporated herein by reference]. The proton NMR spectrum of the sample after aging (FIG. 5) also showed the survival of methyl [—(CH$_2$)$_n$—CH$_3$] and methylene [—(CH$_2$)$_n$—CH$_3$)] protons in the hydrophobic tail at δ=0.83 and δ=1.23 ppm, respectively. The protons of two methyl groups joined with the quaternary nitrogen [—CH$_2$—N$^+$(CH$_3$)$_2$—CH$_2$—] still appeared at δ=3.10 ppm. In addition, the protons of two methyl groups linked with the quaternary nitrogen [—CH$_2$—N$^+$(CH$_3$)$_2$—CH$_2$—] were also observed at δ=2.87 and δ=3.25 ppm. The amide proton [—CH$_2$C=O—NH—] was also seen at δ=7.81 ppm. Therefore, the NMR ($^1$H and $^{13}$C) results confirmed the survival of original structure of the surfactant under harsh conditions. In the FTIR spectrum (FIG. 6) of the zwitterionic surfactant before aging, two stretching vibrations at 2920 and 2849 cm$^{-1}$ were seen corresponding to the methyl (—CH$_3$) and methylene (—CH$_2$—) groups in the hydrophobic tail [Dardir, M., Mohamed, D., Farag, A., Ramdan, A., & Fayad, M. (2017) Preparation and evaluation of cationic bolaform surfactants for water-based drilling fluids. *Egyptian Journal of Petroleum*, 26: 67-77; El-Lateef, H. M. A., Abo-Riya, M. A., & Tantawy, A. H. (2016) Empirical and quantum chemical studies on the corrosion inhibition performance of some novel synthesized cationic gemini surfactants on carbon steel pipelines in acid pickling processes. *Corrosion Science*, 108:94-110; and Shaban, S. M., Aiad, I., Fetouh, H. A., & Maher, A. (2015) Amidoamine double tailed cationic surfactant based on dimethylaminopropylamine: Synthesis, characterization and evaluation as biocide. *Journal of Molecular Liquids*, 212:699-707—each incorporated herein by reference]. The stretching vibration of the carbonyl group was observed at 1641 cm$^{-1}$ and C—N stretching vibration was detected at 1070 cm$^{-1}$ [Zaky, M. F., Badawi, A. M., El Sabbah, I., Ghani, R. A. A., & Hendawy, M. E. (2015) Synthesis, characterization and surface activities of cationic polysaccharide (aloe) schiff base surfactants. *Journal of Surfactants and Detergents*, 18:455-461—each incorporated herein by reference]. The peak at 3416 cm$^{-1}$ corresponded to the amide N—H stretching, and the weak absorption at 3005 cm$^{-1}$ corresponded to the double bond (=CH) in the unsaturated surfactant tail. According to the FTIR spectra (FIG. 6) of the aged sample of the surfactant, two stretching vibrations were observed at 2920 and 2850 cm$^{-1}$, indicating the appearance of methyl and methylene groups in the hydrophobic tail. The existence of carbonyl stretching vibration of the amide group at 1640 cm$^{-1}$ and the stretching vibration of C—N group at 1070 cm$^{-1}$ further confirmed the stability of surfactant under harsh conditions. The amide N—H peak at 3416 cm$^{-1}$ and the unsaturated bond peak at 3005 cm$^{-1}$ were both observed. In summary, the phase behavior, TGA, FTIR, and NMR results revealed the excellent thermal stability of the unsaturated surfactant under harsh reservoir conditions for several days.

EXAMPLE 4

Surface Properties

Figure 7:
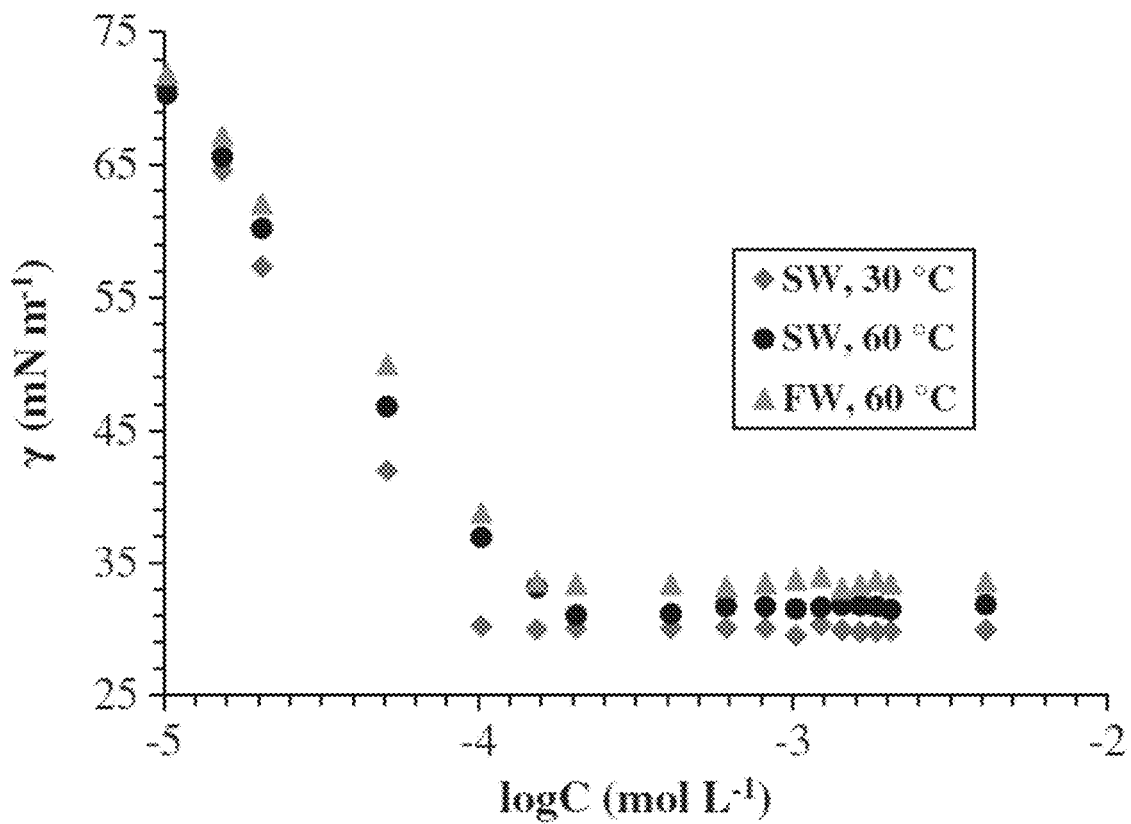
FIG. 7 shows the effect of concentration of surfactant (II) on surface tension in seawater and formation water.

Variations in the surface tension of the unsaturated surfactant with concentration at different temperatures and salinities are summarized in FIG. 7. The surface tension continuously decreased with increasing concentration until reached a break-point at the CMC. The CMC and surface tension corresponding to the CMC (γcmc) were estimated from the breakpoint in surface tension versus concentration plots. The CMC slightly increased with temperature and then decreased with increasing salinity. A similar reduction in CMC with increasing NaCl concentration was reported for the alkyl amidosulfobetaine surfactant [Feng, Y., & Chu, Z. (2016) Correlating surface activity with structural and environmental parameters for alkylamidosulfobetaine surfactants. *Colloid and Polymer Science*, 294:957-963, incorporated herein by reference in its entirety]. However, in this disclosure, the reduction in the CMC was observed when SW was replaced with FW. The reduction in the CMC could be associated with the salting-out effect of the unsaturated surfactant hydrophobic tail, which got enhanced by increasing the salinity [Feng, Y., & Chu, Z. (2016) Correlating surface activity with structural and environmental parameters for alkylamidosulfobetaine surfactants. *Colloid and Polymer Science,* 294:957-963, incorporated herein by reference in its entirety].

The surface tension slightly increased with temperature and salinity. However, the change in the surface tension with temperature and salinity was not significant within the investigated range.

Other surface properties of the unsaturated surfactants, such as the surfactant's efficiency to reduce surface tension ($\pi_{cmc}$), the maximum surface access ($\Gamma_{max}$), and the minimum surface area per molecule ($A_{min}$), are given in Table 2.

TABLE 2

Surface properties of the unsaturated surfactant at different temperatures

| Brine | T (°C.) | CMC (mol L$^{-1}$) | $\gamma_{cmc}$ (mN m$^{-1}$) | $\pi_{cmc}$ (mN m$^{-1}$) | $\Gamma_{max} \times 10^6$ (mol m$^{-2}$) | $A_{min}$ (nm$^2$) |
|---|---|---|---|---|---|---|
| SW | 30 | 1.02 × 10$^{-4}$ | 30.23 | 41.76 | 7.27 | 0.22 |
| SW | 60 | 2.05 × 10$^{-4}$ | 31.03 | 40.96 | 5.60 | 0.29 |
| FW | 60 | 1.53 × 10$^{-4}$ | 33.55 | 38.04 | 5.88 | 0.28 |

$\pi_{cmc}$ decreased with increasing temperature and salinity. The maximum surface excess decreased with temperature and increased with salinity because of decreasing repulsion forces between the hydrophobic tail and the aqueous medium, which ultimately reduced the concentration of surfactant molecules at the air/water interface [Shaban, S. M., Aiad, I., & Ismail, A. R. (2016) Surface parameters and biological activity of N-(3-(dimethyl benzyl ammonio)propyl)alkanamide chloride cationic surfactants. *Journal of Surfactants and Detergents,* 19:501-510]. However, the minimum surface area per molecule increased with the temperature and decreased by increasing the salinity. $A_{min}$ increased with increasing temperature as a result of the decrease in $\Gamma_{max}$ values. As the $\Gamma$max values increase, the distance between the interface and surfactant monomers increase. High temperature reduces the repulsion between the hydrophobic tail and the aqueous medium, which favors the horizontal orientation of the molecule at the interface, hence increasing $A_{min}$ [Shahan, S. M., Aiad, I., & Ismail, A. R. (2016) Surface parameters and biological activity of N-(3-(dimethyl benzyl ammonio)propyl)alkanamide chloride cationic surfactants. *Journal of Surfactants and Detergents,* 19:501-510]. A slight decrease of the $A_{min}$ value in FW might be due to the increase in concentration of the divalent ions (Ca$^{2+}$,Mg$^{2+}$), which favored the shielding of surfactant head charges [Demissie, H., & Duraisamy, R. (2016) Effects of electrolytes on the surface and micellar characteristics of sodium dodecyl sulphate surfactant solution. *Journal of Scientific and Innovative Research,* 5: 208-214, incorporated herein by reference in its entirety]. In summary, although there is some variation in the surface properties of the zwitterionic surfactant with different temperatures and salinities, the change was not significant.

EXAMPLE 5

Interfacial Tension

Interfacial tension is one of the main parameters to assess the performance of surfactants for EOR application. Interfacial tension depends on several parameters such as the nature of the crude oil, salinity, temperature, pH, surfactant type and its molecular structure, surfactant concentration, and residence time of the surfactant inside the reservoir. Table 3 shows the reduction of the IFT between water and crude oil upon addition of the unsaturated surfactant at different temperatures, concentrations, and salinities. The spinning drop tensiometer can measure ultra-low IFT down to $10^{-4}$ mN m$^{-1}$ at various temperatures. This equipment could go up to 90° C., but it was difficult to get a stable drop due to bubble formation, therefore the IFT calculated at 90° C. might not be an accurate representation. Therefore, measuring IFT at high temperature was avoided and another strategy was adopted. Specifically, several solutions at field conditions (90° C.) were aged for 2 weeks and then their IFT was compared with that of the original solution. The water/oil IFT was initially >9 mN m$^1$ in both FW and SW. The addition of the unsaturated surfactant resulted in a decrease of almost two orders of magnitude in the IFT. It is noteworthy that IFT did not change considerably by increasing the surfactant concentration. This was due to the fact that the CMC of the unsaturated surfactant in SW and FW were very low (1.02×10$^{-4}$ mol L$^{-1}$ corresponding to 0.005% surfactant). The low CMC is advantageous because the same IFT reduction can be achieved at a very low surfactant concentration. In addition, IFT will not change considerably because of surfactant adsorption. In general, no considerable change in IFT was detected within the investigated temperatures and salinities. SP formulations having ultralow IFT might give the highest recovery, but ultralow IFT does not necessarily guarantee maximum recovery [Al-Amodi, A. O., Al-Mubaiyedh, U. A., Sultan, A. S., Kamal, M. S., & Hussein, I. A. (2016) Novel fluorinated surfactants for enhanced oil recovery in carbonate reservoirs. *Canadian Journal of Chemical Engineering,* 94:454-460; and Li, P., Yang, C., Cui, Z., Song, B., Jiang, J., & Wang, Z. (2016) A new type of sulfobetaine surfactant with double alkyl polyoxyethylene ether chains for enhanced oil recovery. *Journal of Surfactants and Detergents,* 19:967-977, each incorporated herein by reference in their entirety]. Recent literature indicates that in many cases the highest oil recovery was not from the formulations having ultralow IFT, particularly in heterogeneous reservoirs [Hussain, S. S., Kamal, M. S., Ali, B. E., & Sultan, A. S. (2017) Synthesis and evaluation of novel Amido-amine cationic Gemini surfactants containing flexible and rigid spacers. *Journal of Surfactants and Detergents,* 20:777-788; and Hussain, S. S., Kamal, M. S., & Sultan, A. S. (2017) Amido-amine-based cationic Gemini surfactants: Thermal and interfacial properties and interactions with cationic polyacrylamide. *Journal of Surfactants and Detergents,* 20:47-55, each incorporated herein by reference in their entirety].

TABLE 3

IFT data of the unsaturated surfactant at different salinities and temperatures

| | IFT$^a$ (mN m$^{-1}$) | | |
|---|---|---|---|
| Surfactant concentration (wt. %) | SW (30° C.) | SW (60° C.) | FW (60° C.) |
| 0 | 9.45 | 9.58 | 8.95 |
| 0.01 | 0.31 | 0.36 | 0.33 |
| 0.02 | 0.21 | 0.27 | 0.25 |
| 0.02$^a$ | 0.29 | — | 0.27 |
| 0.05 | 0.25 | 0.31 | 0.23 |
| 0.05$^a$ | 0.29 | — | 0.26 |

TABLE 3-continued

IFT data of the unsaturated surfactant at
different salinities and temperatures

| Surfactant concentration (wt. %) | IFT$^a$ (mN m$^{-1}$) | | |
| --- | --- | --- | --- |
| | SW (30° C.) | SW (60° C.) | FW (60° C.) |
| 0.075 | 0.21 | 0.30 | 0.24 |
| 0.1 | 0.22 | 0.31 | 0.28 |
| 0.2 | 0.23 | 0.32 | 0.27 |

$^a$IFT after aging at 90° C. for 2 weeks.

The data presented in Table 3 indicate that the IFT between water and oil did not change after aging the unsaturated surfactant solutions at 90° C. for 2 weeks. The constant value of IFT after aging is related to the surfactant's thermal stability. In a previous report, it was emphasized that thermally stable surfactants could maintain their IFT well [Kamal, M. S., Sultan, A. S., & Hussein, I. A. (2015) Screening of amphoteric and anionic surfactants for cEOR applications using a novel approach. *Colloids and Surfaces A: Physicochemical and Engineering Aspects*, 476:17-23, incorporated herein by reference in its entirety]. However, a thermally unstable surfactant attained a very high IFT after aging despite the fact that initial IFT was in the ultra-low range. The minimum IFT was achieved at very low concentrations in SW and FW, which is very important from the economy point of view.

EXAMPLE 6

Rheological Properties

Oil recovery using the SP system might be more efficient than with the surfactant alone [Samanta, A., Ojha, K., Sarkar, A., & Mandal, A. (2011) Surfactant and surfactant-polymer flooding for enhanced oil recovery. *Advances in Petroleum Exploration and Development*, 2:13-18, incorporated herein by reference in its entirety]. In EOR applications, surfactants and polymers may be coinjected to simultaneously increase the sweep efficiency and reduce the water/oil tension. Surfactants can influence the rheological properties of the polymer depending on the interactions between the unsaturated surfactant and the polymer. The interactions between the surfactant and polymer can result in the formation of mixed micelles, which can change the rheological properties of the polymer considerably [Ye, Z., Guo, G., Chen, H., & Shu, Z. (2014) Interaction between aqueous solutions of hydrophobically associating polyacrylamide and dodecyl dimethyl betaine. *Journal of Chemistry*, 2014:1-8, incorporated herein by reference in its entirety].

There are a few reports explaining the rheological behavior of zwitterionic surfactant/polyacrylamide and zwitterionic surfactant/hydrophobically modified polyacrylamide. Ye et al. reported that increasing the concentration of a zwitterionic surfactant increased the viscosity of the hydrophobically modified associating polymer at low surfactant concentrations [Ye, Z., Guo, G., Chen, H., & Shu, Z. (2014) Interaction between aqueous solutions of hydrophobically associating polyacrylamide and dodecyl dimethyl betaine. *Journal of Chemistry*, 2014:1-8, incorporated herein by reference in its entirety]. However, when the concentration of the unsaturated surfactant exceeded the CMC, the viscosity of the polymer started to decline. The initial viscosity rise was associated with the formation of mixed micelles. However, a higher surfactant concentration could shield the intermolecular association between the polymer molecules and disrupt the network structure of the polymer, resulting in a reduction of the viscosity. For a zwitterionic surfactant/polyacrylamide system, increasing the surfactant concentration resulted in an increase in the viscosity of the polymer [Bataweel, M. A., & Nasr-El-Din, H. A. (2012) Rheological study for surfactant-polymer and novel alkali-surfactant-polymer solutions. In: *North Africa Technical Conference and Exhibition*, Society of Petroleum Engineers, Cairo, Egypt, Feb. 20-22, 2012, incorporated herein by reference in its entirety].

Figure 8:
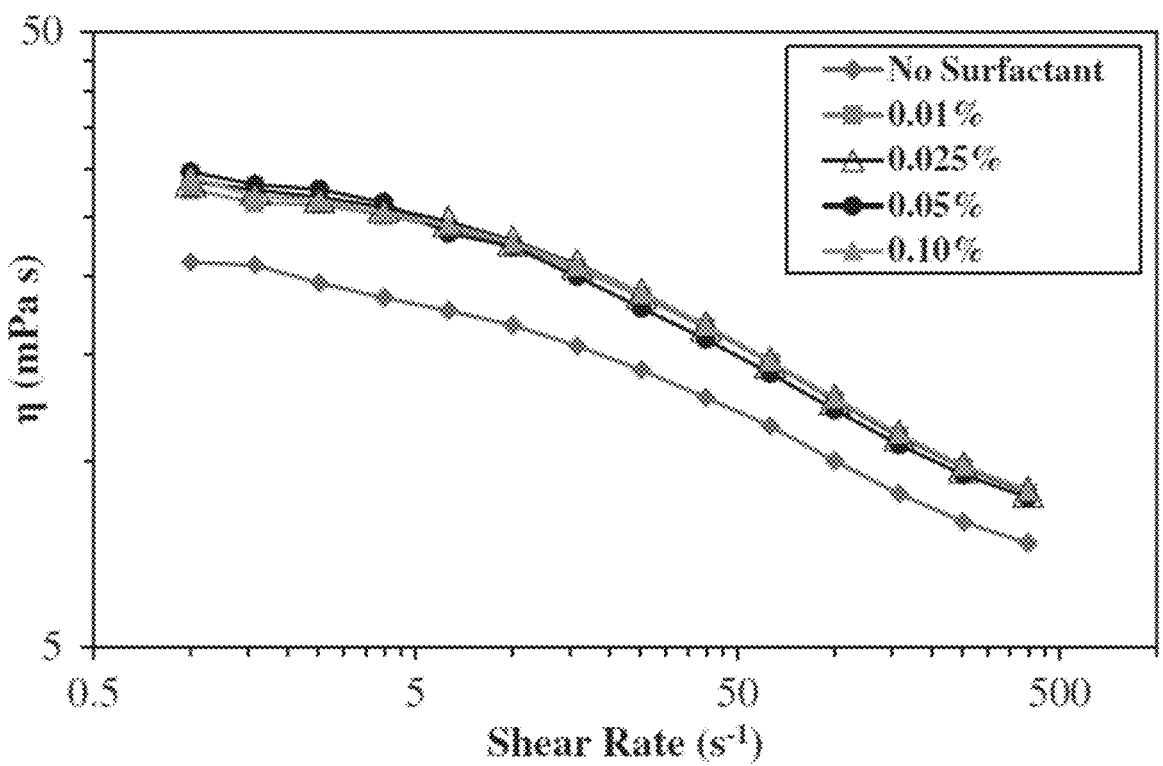
FIG. 8 shows rheological properties of the enhanced oil recovery formulation containing the copolymer and surfactant (II) in different concentrations.

Rheological experiments were performed at a fixed polymer concentration in SW. Values for steady shear viscosity of the unsaturated SP system at varying concentrations of the unsaturated surfactant are given in FIG. 8. The polymer and SP systems showed a shear-thinning behavior, i.e., the viscosity decreased by increasing the shear rate. Upon addition of the unsaturated surfactant, there was an increase in the viscosity of the polymer. However, increasing the unsaturated surfactant concentration had no effect on the polymer viscosity, and comparable values of viscosity were observed for all the SP systems. These results are similar to those of the zwitterionic surfactant/partially hydrolyzed polyacryl-amide (HPAM) system.

EXAMPLE 7

Core Flooding

Figure 9:
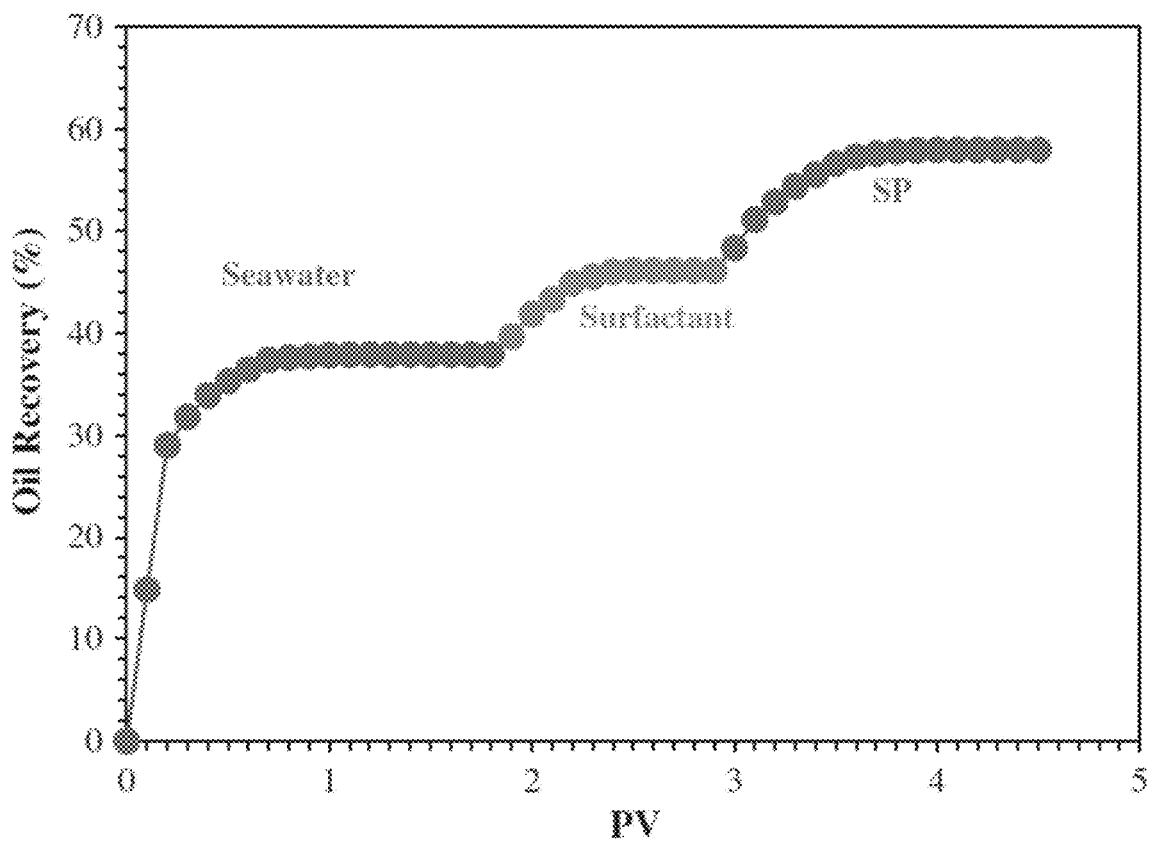
FIG. 9 shows oil recovery efficiencies of methods using seawater only, a composition containing seawater and surfactant (II), and a composition containing seawater and the enhanced oil recovery formulation having the copolymer and surfactant (II), respectively.

A core flooding experiment was performed to investigate the additional oil recovery using the synthesized unsaturated surfactant and the SP formulation. The formation brine was used to measure the permeability of the sample using Darcy law for linear flow. The results obtained from the core flooding experiment are shown in FIG. 9 in the form of oil recovery versus injected PV. In core flooding experiments, SW injection was followed by surfactant and SP injection. SW was injected at 0.5 mL min$^{-1}$ until a stable ΔP was obtained and no more oil was produced. Approximately 37% of original oil in place was recovered using 0.7 PV SW injection at 90° C. Injection of SW continued up to 1.8 PV to make sure that no more oil was recoverable. After SW injection, surfactant injection was carried out to determine the performance of unsaturated surfactant in recovering additional oil at reservoir conditions. Eight percent additional oil was recovered when 0.5 PV surfactant (0.05%) was injected at the same flow rate (0.5 mL min$^{-1}$). However, using SP injection, a total of 58% original oil in place was recovered using 0.25% polymer and 0.05% unsaturated surfactant (21% additional oil). The results obtained at such harsh conditions were comparable to the lab-scale experimental oil recovery values reported in the literature. Usually, for polymer and SP flooding, the reported oil recovery values are in the range of 10-30%. In previous work, oil recovery was obtained using core samples and oil by injecting commercial surfactants and polymers [Al-Amodi, A. O., Al-Mubaiyedh, U. A., Sultan, A. S., Kamal, M. S., & Hussein, I. A. (2016) Novel fluorinated surfactants for enhanced oil recovery in carbonate reservoirs. *Canadian Journal of Chemical Engineering*, 94:454-460; and Malik, I. A., Al-Mubaiyedh, U. A., Sultan, A. S., Kamal, M. S., & Hussein, I. A. (2016) Rheological and thermal properties of novel surfactant-polymer systems for EOR applications. *The Canadian Journal of Chemical Engineering*, 94:1693-1699, each incorporated herein by reference in their entirety]. Other groups also reported oil recovery using SP flooding with different flooding conditions such as the core type, oil type, and temperatures. Approximately 26% oil recovery was reported by Wang et al. using 0.2% surfactant and 0.25% polymer [Wang, D., Liu, C., Wu, W., & Wang, G. (2010) Novel surfactants that attain ultra-low interfacial tension between oil and high salinity formation water without adding alkali, salts, co-surfactants, alcohols and solvents. In: *SPE EOR Conference at Oil & Gas West Asia. Muscat, Oman: Society of Petroleum Engineers*, incorporated herein by reference in its entirety].

EXAMPLE 8

The surface properties, interfacial properties, and thermal stability (short-term and long-term) of a synthesized amidosulfobetaine zwitterionic surfactant containing an unsaturated tail were investigated. Two surfactants bearing a saturated and an unsaturated tail, respectively, were synthesized. The surfactant bearing the saturated tail showed poor solubility in SW and FW. The surfactant containing unsaturated tail exhibited excellent solubility in SW and FW. The short-range thermal stability of the synthesized unsaturated surfactant was examined by TGA, which showed excellent short-range thermal stability with no decomposition of the unsaturated surfactant structure up to 225° C. A unique approach was utilized to investigate the long-range thermal stability based on structure elucidation. The NMR and IR spectra of the sample aged for 15 days at 90° C. exhibited no structure degradation, which confirmed the excellent long-range thermal stability. The zwitterionic unsaturated surfactant showed great potential in lowering the surface tension. The CMC of the unsaturated surfactant in SW and FW was $1.02 \times 10^{-4}$ and $2.05 \times 10^{-4}$ mol $L^{-1}$, respectively. The oil/water IFT measured with the unsaturated surfactant was in the order of $10^{-1}$ mN $m^{-1}$ and was not affected much by temperature and salinity.

The interactions of the synthesized unsaturated surfactant with a commercially available copolymer of acrylamide and 2-acrylamido-2-methylpropane sulfonic acid (AM-AMPS) were evaluated using compatibility and rheological tests. The AM-AMPS copolymer showed excellent thermal stability at elevated temperatures. The unsaturated surfactant showed excellent compatibility with a commercially available acrylamide copolymer.

In addition, oil recovery experiments were carried out with the zwitterionic surfactant and the unsaturated surfactant-polymer (SP) system containing the amidosulfobetaine zwitterionic surfactant. The increase in oil recovery by injecting the unsaturated surfactant solution and SP mixture in solution was 8 and 21%, respectively. In summary, low CMC, low surfactant adsorption, low IFT, excellent compatibility, good long-term thermal stability, and high oil recovery of the synthesized unsaturated surfactant indicated its usefulness in HTHS carbonate reservoirs.

The invention claimed is:
1. A method of recovering hydrocarbons from a reservoir, the method comprising:
injecting a composition comprising an aqueous solution and an enhanced oil recovery formulation into the reservoir; and
collecting hydrocarbons from the reservoir;
wherein the reservoir has a temperature of 100-300° C.;
wherein the aqueous solution is saline having a salinity of 214,000 ppm to 400,000 ppm;

wherein:
the enhanced oil recovery formulation comprises:
a copolymer comprising reacted units of acrylamide and 2-acrylamido-2-methylpropane sulfonic acid; and
a surfactant of formula (I)

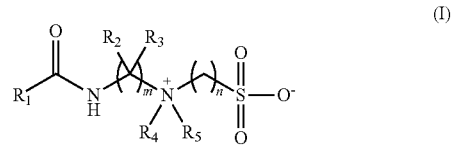

or a tautomer thereof, a stereoisomer thereof, or a mixture thereof,
wherein:
$R_1$ is an alkenyl selected from the group consisting of $CH_3(CH_2)_7CH=CH(CH_2)_6CH_2$—*, $CH_3(CH_2)_5CH=CH(CH_2)_8CH_2$—*, $CH_3(CH_2)_7CH=CH(CH_2)_{10}CH_2$—*, $CH_3(CH_2)_3CH=CH(CH_2)_6CH_2$—*, $CH_3(CH_2)_5CH=CH(CH_2)_6CH_2$—*, $CH_3(CH_2)_8CH=CH(CH_2)_3CH_2$—*, $CH_3(CH_2)_9CH=CH(CH_2)_6CH_2$—*, $CH_3(CH_2)_7CH=CH(CH_2)_8CH_2$—*, and $CH_3(CH_2)_7CH=CH(CH_2)_{12}CH_2$—*;
$R_2$ and $R_3$ are independently selected from the group consisting of a hydrogen, an optionally substituted alkyl, and an optionally substituted cycloalkyl;
$R_4$ and $R_5$ are independently selected from the group consisting of an optionally substituted alkyl, and an optionally substituted cycloalkyl;
m is an integer in a range of 2-5; and
n is an integer selected from 3 and 4, and
the enhanced oil recovery formulation is devoid of terpenes and ethylene glycol monobutyl ether.

2. The method of claim 1, wherein the copolymer has a molar ratio of acrylamide to 2-acrylamido-2-methylpropane sulfonic acid in a range of 1:1 to 25:1.

3. The method of claim 1, wherein the copolymer has a mass average molecular weight in a range of 1,000-20,000 kDa.

4. The method of claim 1, wherein $R_1$ is selected from the group consisting of $CH_3(CH_2)_7CH=CH(CH_2)_6CH_2$—*, $CH_3(CH_2)_5CH=CH(CH_2)_8CH_2$—*, and $CH_3(CH_2)_7CH=CH(CH_2)_{10}CH_2$—*.

5. The method of claim 1, wherein $R_1$ is $CH_3(CH_2)_7CH=CH(CH_2)_6CH_2$—*.

6. The method of claim 1, wherein $R_2$ and $R_3$ are independently selected from the group consisting of a hydrogen and a methyl.

7. The method of claim 1, wherein $R_2$ and $R_3$ are a hydrogen.

8. The method of claim 1, wherein $R_4$ and $R_5$ are independently selected from the group consisting of a methyl, an ethyl, and an isopropyl.

9. The method of claim 1, wherein $R_4$ and $R_5$ are a methyl.

10. The method of claim 1, wherein m is 3.

11. The method of claim 1, wherein n is 3.

12. The method of claim 1, wherein the surfactant of formula (I) is

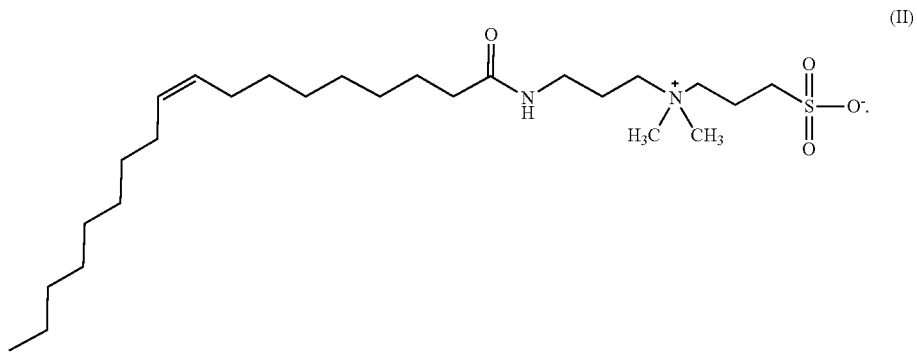

(II)

13. The method of claim 1, wherein the surfactant of formula (I) has a critical micelle concentration of $8\times10^{-5}$-$3\times10^{-4}$ mol/L in the saline.

14. The method of claim 1, wherein the surfactant of formula (I) is present in an amount of 0.01-0.2 wt % relative to a total weight of the composition.

15. The method of claim 1, wherein the copolymer is present in an amount of 0.1-1 wt % relative to a total weight of the composition.

16. The method of claim 1, wherein the reservoir is a carbonate reservoir.

17. The method of claim 1, wherein an amount of the hydrocarbons recovered is 20-50% greater than that of hydrocarbons recovered by a method performed in a substantially similar manner using a substantially similar composition that is devoid of the copolymer.

18. The method of claim 1, wherein the aqueous solution has a calcium ion content of 15,000 to 20,000 ppm, and a magnesium ion content of 2,500 to 4,000 ppm.

* * * * *